(12) United States Patent
Sullivan et al.

(10) Patent No.: US 12,321,230 B2
(45) Date of Patent: Jun. 3, 2025

(54) ALIAS-FREE TAGGED ERROR CORRECTING CODES FOR MACHINE MEMORY OPERATIONS

(71) Applicant: NVIDIA Corp., Santa Clara, CA (US)

(72) Inventors: Michael B Sullivan, Austin, TX (US); Mohamed Tarek Bnziad Mohamed Hassan, Lowell, MA (US); Aamer Jaleel, Northborough, MA (US)

(73) Assignee: NVIDIA Corp., Santa Clara, CA (US)

( * ) Notice: Subject to any disclaimer, the term of this patent is extended or adjusted under 35 U.S.C. 154(b) by 134 days.

(21) Appl. No.: 18/485,132

(22) Filed: Oct. 11, 2023

(65) Prior Publication Data

US 2024/0184670 A1    Jun. 6, 2024

Related U.S. Application Data

(60) Provisional application No. 63/386,121, filed on Dec. 5, 2022.

(51) Int. Cl.
*G06F 11/00* (2006.01)
*G06F 11/10* (2006.01)

(52) U.S. Cl.
CPC .............................. *G06F 11/1044* (2013.01)

(58) Field of Classification Search
CPC ............. G06F 11/1044; G06F 11/1012; G06F 11/1016; G06F 11/1048
See application file for complete search history.

(56) References Cited

U.S. PATENT DOCUMENTS

| | | | |
|---|---|---|---|
| 11,394,403 B1 * | 7/2022 | En Gad | G06F 11/1076 |
| 2020/0210284 A1 * | 7/2020 | Somasekhar | G06F 11/1012 |
| 2022/0398042 A1 * | 12/2022 | Song | G06F 3/064 |
| 2023/0100873 A1 * | 3/2023 | Galli | G06F 11/0772 718/104 |
| 2025/0045156 A1 * | 2/2025 | Zlotnik | G06F 11/1004 |

* cited by examiner

*Primary Examiner* — Joseph D Manoskey
(74) *Attorney, Agent, or Firm* — Carnelian Law, LLC

(57) ABSTRACT

Implicit Memory Tagging (IMT) mechanisms utilizing alias-free memory tags that enable hardware-assisted memory tagging without incurring storage overhead above those incurred by conventional tagging mechanisms, while providing enhanced data integrity and memory security. The IMT mechanisms enhance the utility of error correcting codes (ECCs) to test memory tags in addition to the traditional utility of ECCs for detecting and correcting data errors and enable a finer granularity of memory tagging than many conventional approaches.

23 Claims, 13 Drawing Sheets

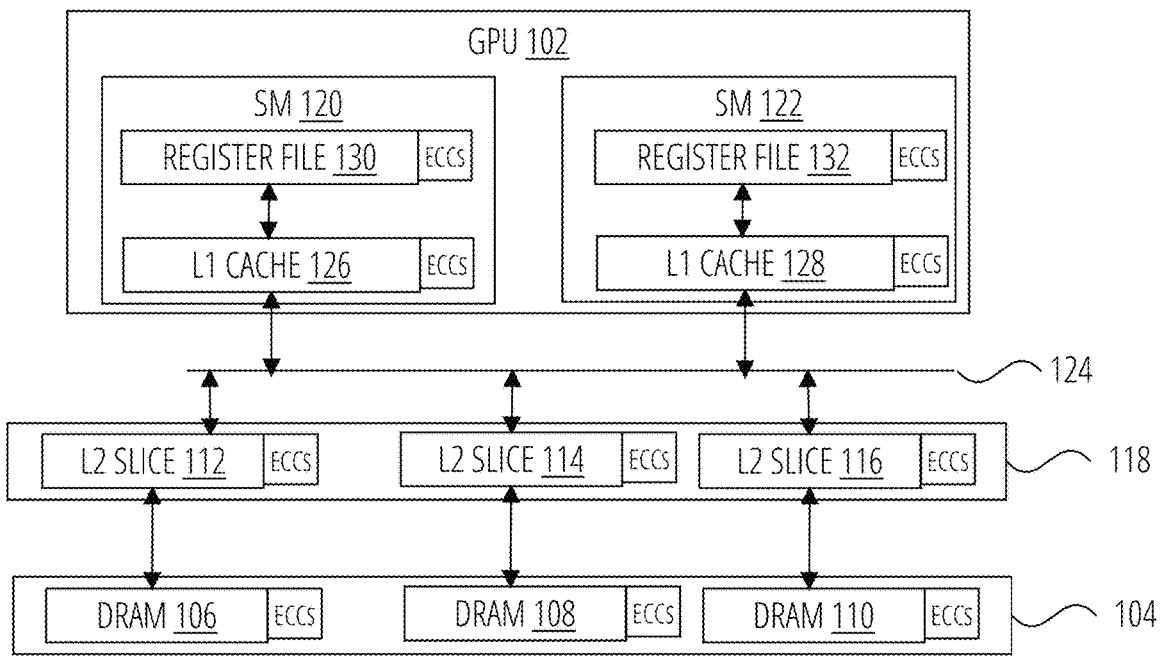
FIG. 1
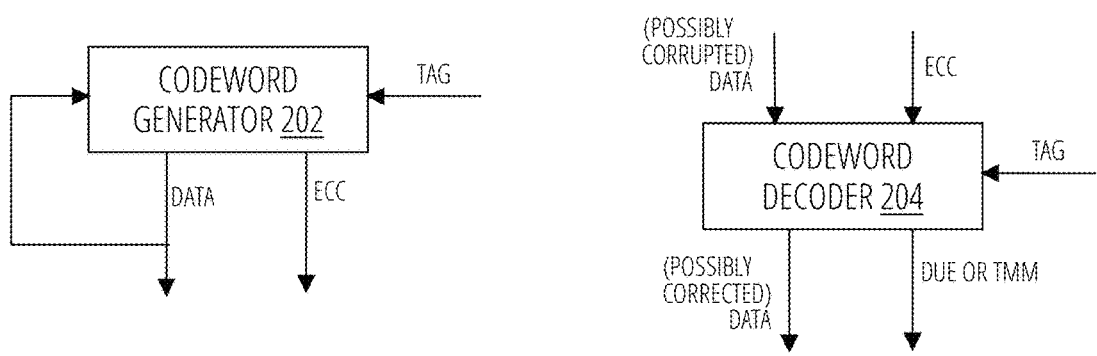
FIG. 2A  FIG. 2B

ALIAS-FREE TAGGED ERROR CORRECTING CODES FOR MACHINE MEMORY OPERATIONS

CROSS-REFERENCE TO RELATED APPLICATIONS

This application claims priority and benefit under 35 USC 119(e) to US Application Ser. No. 63/386,121, "Implicit Memory Tagging Through Alias-Free Tagged ECC", filed on Dec. 5, 2022, the contents of which are incorporated herein by reference in their entirety.

BACKGROUND

Some computer instruction languages, such as C and C++, may enable inadvertent or deliberate machine memory security violations, such as non-adjacent buffer over-/under-flows and access and/or use of memory regions after they are freed by the program that allocated them. Memory tagging is a hardware-assisted mechanism that may be utilized to enhance memory security.

Memory tagging assigns a tag to (typically small) areas of memory, referred to as granules, and stores the tag in upper bits of any data pointers to the granules. During program execution, memory safety violations are detected by comparing the tags of the pointers and the tags of the accessed memory granules. An exception signal is generated if (on condition that) the tags do not match.

The configuration of the tag size, TS, and the granule size, TG, impacts the levels of security, reliability, and performance enabled with memory tagging. If a program creates more than $2^{TS}$ memory allocations, some tags get reused on more than one granule, creating what are called 'aliased tags' and reducing the strength of the memory security obtained. Increasing the tag size to enable the tagging of more and smaller granules comes at the cost of increased memory utilization by pointers and program memory allocations comprising the tags. In practice, conventional implementations utilize relatively small tag sizes with correspondingly higher tag aliasing and weak security. Some conventional approaches "steal" bits from error correcting codes (ECCs) associated with data to increase the number of bits in the tags. However, such bit stealing compromises the efficacy of the ECCs to detect and correct data errors.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 1 depicts an example memory hierarchy for a system utilizing a graphics processing unit.

FIG. 2A and FIG. 2B depict embodiments of a Tagged ECC codeword generator (encoder) and decoder, respectively.

DETAILED DESCRIPTION

Figure 3:
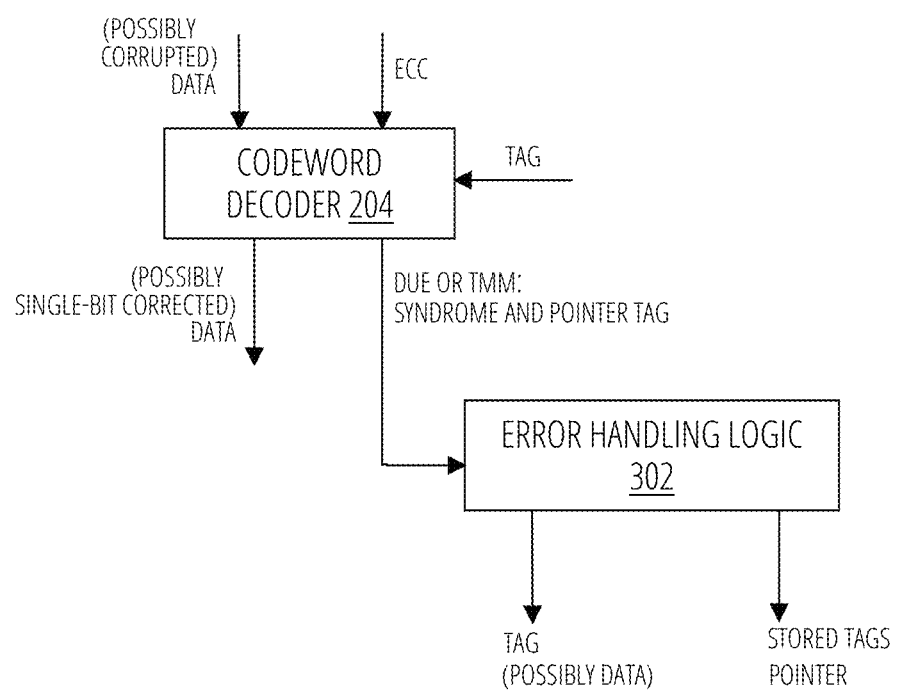
FIG. 3 depicts logic to handle tag mismatch errors and/or uncorrectable multi-bit errors in one embodiment.

The implementation of memory tagging in systems utilizing graphic processing units (GPUs) may be particularly challenging. The memory available to program executing on GPUs tends to be relatively constrained in comparison to the memory available to programs executing on general purpose computer processors. The additional overhead incurred by memory and pointer tags may therefor be more impactful to programs executing on GPUs.

Compute and edge-class GPUs also allocate substantial memory overhead to strong error detection and correction codes (ECCs) for data storage and reliability. Maintaining strong error protection enables these platforms to protect against and recover from multi-bit errors.

Described herein are Implicit Memory Tagging (IMT) mechanisms that enable hardware-assisted memory tagging on GPUs without incurring additional storage overhead. These mechanisms enhance the utility of error correcting codes (ECCs) to test memory tags in addition to the traditional utility of ECCs for detecting and correcting data errors.

Error correcting codes are utilized to detect and possibly correct data errors using redundant values that are algorithmically generated from the protected data. A valid pairing of a data value and an ECC is referred to as a codeword, while an invalid pairing is referred to as a non-codeword. An (N, K) codeword comprises N total bits: K data-bits and R=(N−K) ECC bits.

The process of generating a codeword from data is referred to as encoding, and the process of detecting errors in the codeword and (possibly) restoring the correct data value is referred to as decoding. In many implementations, encoding and decoding are carried out in low-latency fixed-function hardware circuits.

An ECC code of bit-length R provides single-bit error correction for up to $N=2^R-1$ bits of information (including the ECC bits themselves). The maximal bit-length that may be corrected is a non-power-of-2, and the ECC may be shortened without loss of efficacy by reducing the number of data bits it is associated with in the codeword. The silent data corruption risk (undetected changes to the data) associated with of shortened ECCs decreases along with a decrease in the number of data bits.

The disclosed mechanisms utilize an ECC structure herein referred to as Alias-Free Tagged ECC (AFT-ECC). Error detecting and correcting codes comprising this structure may be applied to unambiguously identify tag mismatches in the absence of data errors, while maintaining their efficacy for handling data errors. Utilizing these mechanisms, memory security may be enhanced without additional memory overhead while maintaining the error correction and detection capabilities of ECCs.

The AFT-ECC mechanisms maintain the probabilistic error detection capabilities of similar-sized conventional ECCs for severe data errors. The single-bit error correcting capabilities of conventional ECCs are also maintained.

The AFT-ECC structure comprises check bits and tag bits. A tag embedded in the ECC check bits may be utilized to unambiguously identify tag mismatches while preserving single-bit data error correction. Mechanisms are disclosed herein to generate a parity-check matrix with alias-free tags and to determine a tag size limit that maintains alias-free properties. For most common error-correcting codeword sizes, the maximum tag size is one fewer bits than the ECC redundancy.

Implicit Memory Tagging (IMT) mechanisms are disclosed to enable hardware-assisted memory tagging without incurring additional storage or memory traffic overhead. Implicit Memory Tagging applies AFT-ECC-structured codes to test for memory security violations in addition to its detecting and correcting data errors.

Implementations utilizing IMT mechanisms may outperform conventional hardware-assisted memory tagging approaches in performance, security, and reliability. Implementations utilizing IMT may incur no performance penalties beyond those already imposed by conventional ECC protection mechanisms and do not degrade the error correction or detection capabilities of the ECCs. Utilizing IMT may enable the use of larger tag sizes (and hence enable protection of smaller memory granules) than with conventional industry memory tagging mechanisms.

The examples utilized herein involve applications of AFT-ECC to memory tagging for enhanced system security and reliability. However AFT-ECC is a general mechanism with many practical applications in computing systems.

For example, AFT-ECC may be utilized to provide low-overhead DRAM cache tag checking. 2) improved performance on bulk cache invalidation, 3) address protection, for example by storing a memory address (for instance, DRAM row/bank/column) in the tag. 4) ownership tagging, by which memory objects may be tagged with a runtime-defined "owner", such as a user ID. 5) random jump detection, by which AFT-ECC is applied to instruction memory to mark valid branch targets and partially guard against control-flow errors, 6) type tagging, by which memory objects or variables are tagged with a "type", where the operations executed on these objects/variables are checked and restricted to use with the type, 7) epoch counters for check-pointing, enabling the recording, at a fine resolution, of whether a granule has been checkpointed or not, 8) full/empty bits (aka "mailboxing" and other terms) for synchronization, whereby full/empty bits are meta-data that aid in synchronization of producer-consumer access patterns, and 9) transactional memory, enabling lock-free speculative parallelization by enabling many parallel threads to execute, and rolling back and serializing operations if they interfere with one another.

Other applications of AFT-ECC are 1) fine-grained sub-page (within a memory page) access control, whereby AFT-ECC is applied to maintain sub-page access control bits by associating memory operations with smaller (e.g., 32-byte) memory chunks rather than a whole page, 2) large-capacity hardware-assisted watchpoints, whereby hardware supports the monitoring a set of user-selected memory addresses and generates an exception or trap when a monitored address is accessed, and 3) setting fine-grained cache eviction or prefetching hints on memory regions or addresses without consuming additional cache or DRAM storage.

FIG. 1 depicts an example memory hierarchy for a system utilizing a graphics processing unit 102. Although two levels of cache memory are depicted, the mechanisms disclosed herein are applicable to memory hierarchies with different numbers of memory levels than this (e.g., those utilizing a Level 3 cache or just a Level 1 cache).

The graphics processing unit 102 utilizes a plurality of memory channels to support concurrent accesses to system memory 104 comprising Dynamic Random Access Memory (DRAM) devices 106, 108, 110, from many concurrently executing program threads. Each memory channel is coupled to one or more Level 2 (L2) slices 112, 114, 116 in a level 2 cache 118. The L2 slices are shared among multiple streaming multiprocessors (SMs) 120, 122 through a cross-bar switch 124. Each streaming multiprocessor comprises an Level 1 (L1) cache 126, 128, which may be configured to operate as a shared memory scratchpad.

The exemplary embodiments and descriptions herein are directed to an exemplary memory with a 32 byte memory allocation and access granularity at all levels of the memory hierarchy, for example by utilizing sectored caches. In these examples a single codeword is formed for each 32 byte granule of data to align with the memory access granularity.

In the memory hierarchy depicted in FIG. 1, data stored in DRAM, caches, and register files 130, 132 may be protected with single-bit-error-correcting, double-bit-error-detecting (SEC-DED) codes. In some other memory hierarchies, a write-through L1 cache may utilize error detection only, with error correction relying upon the data being replicated in the L2 cache. If the L1 cache also functions as an exclusive scratchpad, it should provide both of error detection and error correction to ensure high availability.

Utilizing SEC-DED ECC codes with 32 byte granular memory access requires at least 10 bit ECC codes. Due to structural constraints, ECC protection may be applied differently in the DRAM 106, 108, 110 than at other levels of the memory hierarchy. For example, some modern high-bandwidth memory (HBM) and Graphics Double Data Rate (GDDR) memories may provision 2 bytes of rank-level ECC bits per 32 byte data access.

A linear block algorithm may be utilized to generate an R-bit ECC from a linear combination of the data bits. The allowed linear relations for a given ECC are determined from an R×N parity check matrix, H, where N is the codeword bit length. Valid codewords are typically those within the null space of H, as represented by Equation 1.

$$H * c^T = 0 \qquad \text{Equation 1}$$

Arithmetic is performed in a binary finite field (GF(2)). An N-bit codeword, c, may potentially suffer from an error, e, during storage to memory, or when reading/decoding the stored value. In this case the codeword is corrupted to $c_e$ ("codeword with error"), as represented by Equation 2.

$$c_e = c + e \qquad \text{Equation 2}$$

Upon receiving a possibly-erroneous codeword, the decoder first generates a syndrome, as represented by Equation 3.

$$s = H * c_e^T = H*(c+e)^T = H*c^T + H*e^T = 0 + H*e^T = H*e^T \quad \text{Equation 3}$$

If the codeword is invalid, the syndrome will be non-zero. The magnitude of the syndrome depends only on the error, if any. Error correction is enabled for a restricted class of errors (e.g., single-bit corruption) by constraining H such that each correctable error maps to a single unique syndrome. For example, to provide single-bit error correction, a constraint on the H matrix is that every column should be unique.

A systematic ECC is one whose data and check-bit locations in the codeword are fixed; most practical ECCs are systematic. Structurally, a systematic ECC places further constraints on the parity check matrix, specifically that the check-bit columns are constrained to form the identity matrix. The systematic H matrix comprises two submatrices: the R×K data submatrix ($D_K$) and the R×R identity submatrix ($I_R$).

Tagged ECC is an ECC structure than enables the decoder to check for equivalence between tags of size TS on pointers and memory regions. Tagged ECC utilizes an additional R×TS parity check submatrix denoted $T_{TS}$. The parity check matrix for tagged ECC comprising these three sub-matrices may be represented as:

$$H_{Tagged} = (T_{TS}|D_K|I_R)$$

Tagged ECC may be implemented on any sufficiently-shortened systematic ECC code. FIG. 2A and FIG. 2B depict embodiments of a Tagged ECC codeword generator 202 (encoder) and codeword decoder 204, respectively. Tagged ECC generates ECC check-bits using both the data and the tag, but obviates the conventional storage of the tag explicitly to memory. Rather, upon ECC decoding, the equivalence of the encoded tag is checked against a reference tag supplied to the decoder.

Conventional tagged ECC implementations provide probabilistic tag mismatch guarantees, meaning that some invalid tags may remain undetected. They also lack guaranteed attribution of tag mismatches—there is no way to distinguish between tag errors and data errors for the purposes of error reporting and logging. Probabilistic tagged ECC finds utility mainly in environments in which a tag mismatch is a random and rare event. This may by the case for some DRAM address error checking implementations, for example.

Probabilistic tagged ECC has limitations. For example, a party attempting to breach the system may deterministically evade a tag mismatch by XORing any valid tag with a tag-error pattern that is undetected by the ECC. Additionally, without proper tag mismatch attribution it is not possible to distinguish between data-related detected-uncorrectable errors (DUEs) and security-related tag mismatches (TMMs).

In one embodiment, correctable errors (e.g., a tag match with a single-bit data error) are processed with hardware decoding logic. Upon a fatal error (tag mismatch or multi-bit error), the error syndrome and pointer tag are passed to error handling logic 302, as depicted in FIG. 3. In one embodiment, the error handling logic is implemented as a software driver. A software driver is a low-level software component of the device or platform operating system that interfaces with (typically hardware) components of the device or platform.

A syndrome may be identified as a TMM or DUE by applying a set membership query to the space of 2R−1 tag syndromes. This query may in some embodiments be performed by communicating to a data processor's error handling driver the error syndrome for uncorrectable DUE and/or TMM events. In some embodiments, the pointer and tag values may be reported to the driver along with a TMM event.

To recover a tag value in the event of a TMM error, the tag error may be mapped to its unique syndrome, which when XORed with the pointer tag yields the stored tag value. In one embodiment, this procedure may be executed by software logic by communicating the pointer tag to the error handling logic, and XORing it with the tag error pattern given by a (2R−1)-sized entry in a tag-error-syndrome lookup table (an associative memory structure). In the rare event of a misattributed multi-bit data error, the tag recovery may silently fail (meaning the tag corruption won't be detected) and the tag will remain corrupted and inaccurate.

Common virtual address space address sizes for systems utilizing GPUs are: 48-bit virtual addresses in environments utilizing x86_64 processors, 49-bit virtual addresses in environments utilizing ARM processors, and a 46-bit virtual addresses in environments utilizing IBM POWER9 processors. A system utilizing 49-bit virtual addresses may have ample provision for tag bits. In one embodiment an IMT-enabled system utilizes 16 bits of ECC per 32 bytes of data. In this embodiment a 15-bit tag is utilized for each 32 byte codeword. In another embodiment, 10 bits of ECC (providing SEC-DED redundancy) are utilized along with a 9-bit tag for each 32 byte codeword.

The tagging mechanisms described herein are alias-free, and may be referred to as Alias-Free Tagged ECC (AFT-ECC). In conventional mechanisms, a multi-bit error can cause an erroneous codeword to alias to a valid-yet-also-erroneous codeword, evading detection. A tag mismatch (for any tag size TS>1) manifests to the decoder as a multi-bit error.

However with AFT-ECC, the tag submatrix is formed to be alias-free, ensuring unambiguous tag mismatch detection in the absence of a data error. The AFT-ECC codes also maintain single-bit error correction against data errors. Utilizing AFT-ECC, tag mismatches (in the absence of a data error) are detected as such, and the tag value may be recovered for debugging and logging purposes.

The set of linear combinations of the columns of the tag submatrix $T_{TS}$ is denoted by $\mathbb{T}$. This is the column space of $T_{TS}$. A tag submatrix is alias-free if no tag mismatch remains uncaught (i.e. if $0 \notin \mathbb{T}$). In other words, all columns of an alias-free tag submatrix should be linearly independent. Thus, any nonsingular matrix with full column rank has the alias-free property. Being nonsingular, an alias-free submatrix will map each possible tag error to a unique syndrome, making tag attribution possible in all cases in the absence of a data error.

Figure 4:
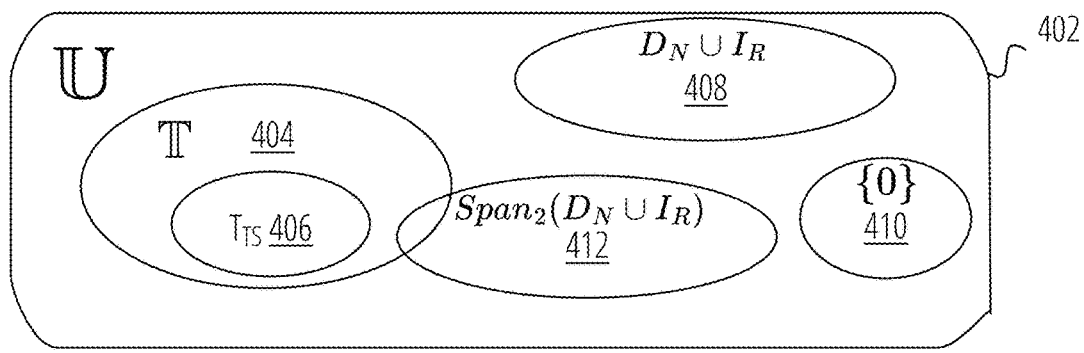
FIG. 4 depicts a visualization of constraints on an AFT-ECC parity check matrix.

To maintain single-bit error correction, every column of the H matrix is made unique. No power-of-2 column should be present in the column space of $T_{TS}$, and the submatrix $D_K$ is constrained to not intersect with the column space of submatrix $T_{TS}$. FIG. 4 depicts a visualization of the constraints placed on an AFT-ECC parity check matrix. In the set of all data error syndromes 402, the column space of $T_{TS}$ 404 ($\mathbb{T}$) comprises the tag sub-matrix 406 and does not intersect with the data and identity sub-matrices 408 ($D_N \cup I_R$). To ensure no tag aliasing and proper attribution, $\mathbb{T}$ does not comprise the all-0 syndrome 410 ({0}). Some multi-bit error syndromes 412, including syndromes for some 2-bit errors, overlap with the column space of $T_{TS}$ 404, potentially leading to misattribution of these errors as a tag mismatch.

It follows from the alias-free property that the maximum tag submatrix size is TS=R. If TS>R, the R×TS tag submatrix becomes non-square, with more columns than rows. Linear dependence exists along the larger dimension of a non-square matrix, and thus when TS>R the alias-free property is obviated. Because an alias-free submatrix maps each tag error to a unique syndrome, the dimension of the column space of $T_{TS}$ is dim($\mathbb{T}$)=$2^{TS}$−1. Single-bit error correction cannot be maintained with the maximal tag size because when TS=R, the column space $\mathbb{T}$ covers all possible non-zero columns, making it impossible to maintain unique columns in the H matrix.

When TS<R, however, single-bit error correction up to a data size limit may be maintained. To do so calls for dim($\mathbb{T}$) to be configured small enough to leave at least K+R syndromes free. An upper bound on the alias-free tag size while maintaining single-error correction is given by Equation 4. Solving for the tag size yields Equation 5.

$$2^R - 1 - 2^{TS} \geq N \quad \text{Equation 4}$$

$$TS \leq \lfloor \blacksquare \rfloor \lfloor \blacksquare (2^R - N) \rfloor \quad \text{Equation 5}$$

Figure 5:
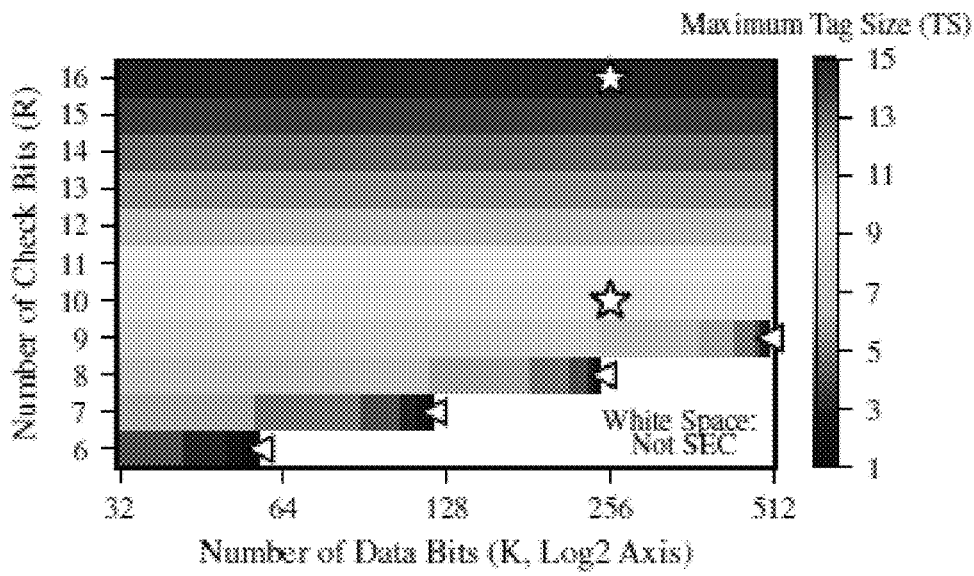
FIG. 5 depicts a visualization of constraints on tag sizes for various data sizes and ECC redundancies.

FIG. 5 depicts a visualization of the constraints represented in Equation 5 at various data sizes and ECC redundancies. Each point in the plot is shaded according to the maximum value of TS at a (K, R) point. Unshortened ECCs are marked with a left-facing triangle, and white space indicates ECCs that do not enable error correction. White stars are depicted at coordinates for mechanisms utilizing 10 bits of redundancy on 256 bits of data, and 16 bits of redundancy on 256 bits of data. An unshortened code cannot support any tag; with one bit of shortening, at most TS=1 is possible. As the degree of shortening increases, so does the maximum TS. For common SEC-DED codeword sizes with power-of-2 numbers of data bits, the maximum tag size is one fewer bit than the ECC redundancy. At R=10, Implicit Memory Tagging utilizes at most a tag of size TS=9; at R=15, the maximum tag size is TS=15.

One mechanism for generating the tag and data submatrices utilizes a nonsingular matrix with all-even-weight columns for the tag submatrix, and sets unique all-odd-weight columns in the data submatrix. This ensures that the tag submatrix is alias-free while maintaining double-bit error detection and single-bit error correction. The "weight" of a column or row is the number of "1" values configured in the column or row, respectively. A straightforward variation interchanges the "1" and "0" settings in the matrices, without loss of utility. In this variation, the weight of a column or row is the number of "0" settings in the column or row, respectively.

Parity check matrices with unique all-odd-weight columns (such as Hsiao codes) are SEC-DED compliant, because the XOR of any two odd-weight columns gives an even-weight syndrome, and no aliasing is possible between an even-weight syndrome and exclusively odd-weight columns.

The column space of any all-even-weight tag submatrix is all-even. No aliasing is therefore possible between the even-weight $T_{TS}$ column space and the odd-weight $D_K$ or $I_R$ submatrices. Single-bit error correction is thereby maintained.

Some embodiments may utilize all weight-2 columns for the tag submatrix, to reduce circuit area taken up by the (hardware) decoder logic, and to reduce decoding time by minimizing the maximum number of 1s that appear in a given row of the tag submatrix.

Figure 6:
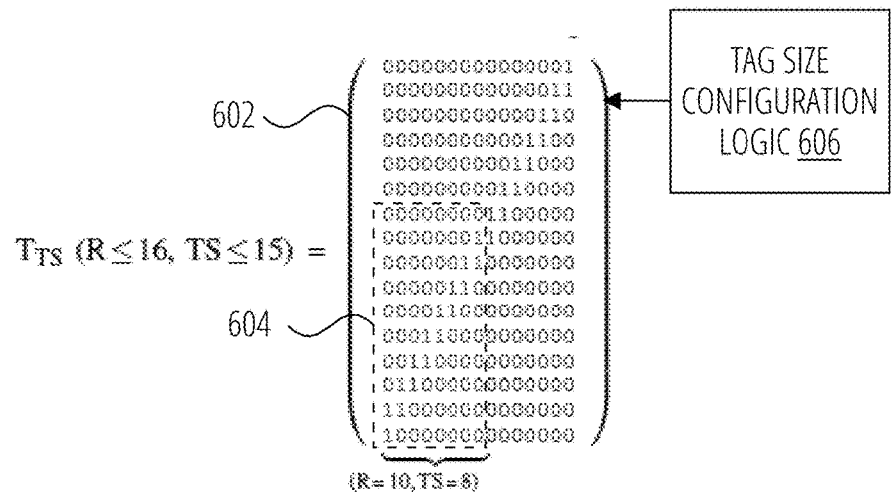
FIG. 6 depicts an example of tag sub-matrix implementation logic.

The design parameters above lead to analytically straightforward approaches to generating attractive tag submatrices without executing far-ranging and computationally expensive search algorithms. FIG. 6 depicts an example of tag sub-matrix implementation logic for AFT-ECC with R=16 bits of ECC redundancy, which can support up to a TS=15 bit tag for some data sizes. The number of 1s is minimized in this exemplary tag submatrix, as is the maximum number of 1s per row. The depicted full tag sub-matrix 602 logic and reduced tag sub-matrix 604 may be implemented for example as binary settings that configure a machine memory.

The exemplary full tag sub-matrix 602 logic depicted in FIG. 6 supports a largest single-error-correcting tag size (TS=R−1=15). If the number of data bits to protect exceeds the protection capabilities of this tag size, the tag size may be reduced and a reduced tag sub-matrix 604 obtained by removing columns. Any subset of columns from an alias-free tag sub-matrix such as tag sub-matrix 602 is also alias-free, therefor any columns may be removed without compromising the alias-free properties of the resulting reduced tag sub-matrix. Some rows may also be removed along with the columns, reducing both dimensions of the resulting reduced tag sub-matrix.

The columns of the tag sub-matrix 602 depicted in FIG. 6 are sorted to enable $T_{TS}$ formation for lower ECC redundancies by retaining the R lowest rows. An example for (R=10, TS=8) is tag sub-matrix 604—portions of ten lower rows and eight leftmost columns from the full tag sub-matrix 602 are utilized to form a valid reduced tag sub-matrix 604 that supports larger data sizes than the full tag sub-matrix 602.

The dynamic configuration of tag size is therefor provided, enabling systems in which programs or other system components may utilize tag size configuration logic 606 to dynamically configure the operative rows and columns of the full tag sub-matrix 602 to set larger or smaller tag sizes and thus finer or coarser memory granule security. For example, an application in a data center that does not call for fine-grained memory security but does call for reliable multi-bit data error checking and correction may configure a memory tag size that is lower than an application that can tolerate more data errors but will likely utilize a finer level of memory security.

The nature of the AFT-ECC mechanism enables the algorithmic determination of an AFT-ECC data submatrix. A selection of any all-odd-column $D_K$ submatrix comprises the enabling properties. In some implementations, an ECC space search may be utilized to obtain refinements in some metrics of ECC and tagging efficacy.

One such search algorithm generates minimum odd-weight-column $D_K$ submatrices with a genetic algorithm that minimizes the maximum number of 1s (ones) per row and maximizes 3-bit error detection capabilities.

The disclosed AFT-ECC mechanisms enable tag equivalence checking for enhanced memory operation security, while maintaining the data error correction and detection capabilities of conventional ECC. To maintain the error detection capabilities of conventional ECC, a tag mismatch (TMM) should be fatal or should trigger recovery logic that also recovers from data errors (e.g., rollback and restart from an error-free checkpoint). In rare multi-bit error cases, a severe data error could be misidentified as a tag mismatch.

AFT-ECC provides implicit tag equivalence checking, but it does not explicitly store or contain the tag values. In the presence of a data error, it may not be possible or practical to extract the tag values assigned to a codeword using AFT-ECC without risking tag misattribution. If detected tag mismatches are constrained to be fatal (not recoverable), the AFT-ECC mechanisms exhibit the following behavior:

i. In the absence of a data error, all tag mismatches are detected and properly attributed (TMM=100%).

ii. In the absence of a tag mismatch, single-bit data errors are corrected. Multi-bit data errors are detected with the same probability as untagged ECC, so that there is no increased risk of silent data corruption over conventional ECC.

iii. There is some misattribution risk of AFT-ECC reporting a detected-uncorrectable multi-bit error as a tag mismatch.

iv. There is no risk of misattributing a tag mismatch as a detected-uncorrectable multi-bit error.

The Implicit Memory Tagging (IMT) mechanisms propagates tag information along with ECC check-bits using end-to-end ECC. The IMT mechanisms utilize AFT-ECCs to check for the equivalence of a memory tag and to detect and correct data errors.

Unlike conventional mechanisms, IMT does not decrease the efficacy of ECCs by 'stealing' ECC bits to explicitly store memory tags. The performance and storage benefits of conventional ECC 'bit stealing' are maintained without the resulting system reliability degradation.

Implicit Memory Tagging embeds the memory tag in the ECC check bits and embeds the pointer tag in the upper bits of a memory address. In some implementations, this may involve widening address busses down to the L2 cache level to accommodate the tags associated with a memory operation, unless the address busses are sufficiently over-provisioned already. The pointer tag is extracted from the memory address and communicated to ECC encoders and decoders along the data path along the memory hierarchy.

Figure 7:
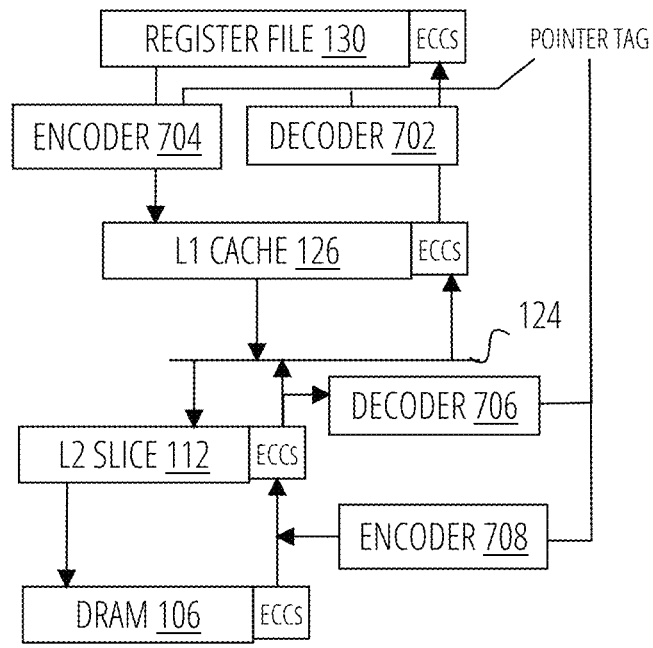
FIG. 7 depicts an embodiment of an Implicit Memory Tagging (IMT) system.

FIG. 7 depicts an embodiment of an Implicit Memory Tagging system referred to herein as End-to-End ECC. In End-to-End ECC implementations, the codewords comprising the ECC check-bits and data are propagated from the DRAM 106 or other lowest level along the memory hierarchy path and decoded (codeword decoder 702) upon retrieval from the level 1 cache 126. Likewise data to store in the L1 cache or lower in the memory hierarchy is encoded once (codeword generator 704).

In an alternative implementation, the pointer tag are passed to the encoders and decoders in the path from the data processor to main memory. In this scenario three types of tags come into play. The first type is an unverified tag that is stored in the upper bits of the pointer. The second type is a lock tag that is stored in the physical address space (or ECC). Lock tags are used for verification. The third type is a verified key tag, which is the tag stored in the upper pointer bits for a memory access that has already been verified.

Each decoder along the path checks for equivalence between the key tag and the lock tag (validates the key tag). Each encoder along the path embeds the (already-validated) key tag in the ECC bits. For example, assume that the codeword size is the same at all levels of the memory hierarchy and also, assume the caches are write-through. Without end-to-end ECC, a fetch from DRAM will pass through, in order, the DRAM decoder, the L2 encoder, the L2 decoder, the L1 encoder, and the L1 decoder. At each decoding point, the key tag is checked against the embedded lock tag. If nothing fails (i.e. no tag mismatch or DUE), then the output of the decoder will be the corrected data and the key tag will have been verified as the "true" tag. Each encoder takes the previously-verified key tag that is embedded in the address, and embeds that tag as a lock tag in the ECC that is generated for the next level of the cache hierarchy. This key tag can be trusted to be the true tag, because it was checked by the decoder(s) in lower levels of memory.

Thus, the first decoder in the fetch path from main memory receives the unverified key tag, and all decoders at higher levels of the memory hierarchy receive the verified key tag. All encoders receive the verified key tag. The lock tag is embedded in the ECC at each level of the memory hierarchy.

However, end-to-end ECC moves data and ECC bits between the L2 and L1 caches and decodes and validates the data exclusively following L1 reads. The tag needs be available in the address up to the L1 cache, but lower levels of the memory hierarchy (e.g., L2 cache and DRAM) may use the "raw" address, without tag bits, if desired.

End-to-End ECC should be used past the point (toward main memory) of the last write-back cache (e.g., the level 2 cache slice 112 in FIG. 7), because upon a dirty writeback, the ECC-embedded tag value cannot be extracted without risking silent data corruption.

Some systems, such as those utilizing GPUs, may support near-memory atomic operations, for example processor requests for codewords stored in the L2 cache.

For example, consider an atomic addition of data in the L2 cache. (Atomic operations complete without interruption or interference from other concurrently executing processes, avoiding race conditions). The atomic operation reads the data from the L2 and provides it to the processor directly through a data path dedicated to atomic operations in the L2 peripheral logic, and then writes back results of the operation to the L2 directly over the same dedicated path. The atomic operation data path may utilize its own decoder and encoder, rendering the previously-described end-to-end ECC implementation insufficient. To compensate, the unverified key tag may be provided to the atomic data path decoder and the verified key tag may be input to the atomic data path encoder.

Thus to guard against the use of corrupted data in these atomic operations, the atomic operation data path may utilize a codeword decoder 706 and a codeword generator 708. During IMT the pointer tag may be provided to the codeword decoder 706 and codeword generator 708 through the address bus.

Coalescing is a mechanism to increase bandwidth utilization along the data path by merging multiple memory accesses for smaller chunks of data into fewer accesses for larger data chunks. For example, some Single Instruction Multiple Thread/Data (SIMT/SIMD) GPUS dynamically coalesce different data accesses by the same instruction executed in different threads.

Nonblocking caches reduce pipeline stall penalties by handling one or more cache misses without stalling. In addition, they also group misses by cache line so that a single cache line request can serve multiple misses from that line. Each in-flight cache line is stored in a miss status holding register (MSHR), each MSHR comprising multiple entries each comprising the cache line offset and source of one cache miss.

Figure 8:
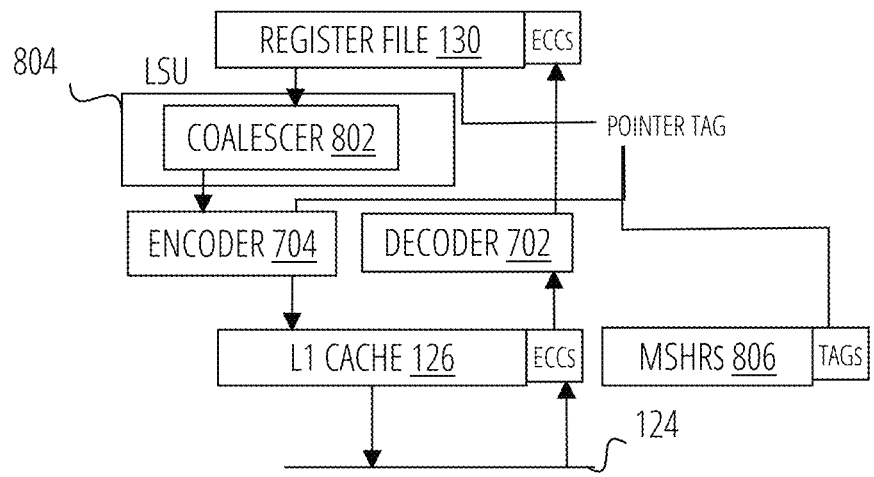
FIG. 8 illustrates an aspect of the subject matter in accordance with one embodiment.

A memory architecture such as the one depicted in FIG. 1 may be augmented to enable IMT, as depicted in FIG. 8. The upper virtual address bits are extracted from the per-thread address stream before coalescing, such that the memory coalescer 802 (a component of the load/store unit 804) does not split apart neighboring memory addresses with differing pointer tags. The pointer tags are stored in the widened address bits of the miss-status holding register 806 utilized at the L1 level for storing cache miss status. When data is retrieve from a lower level of memory to L1, the L1 miss-status holding register 806 provides the tag to the AFT-ECC decoder.

Figure 9:
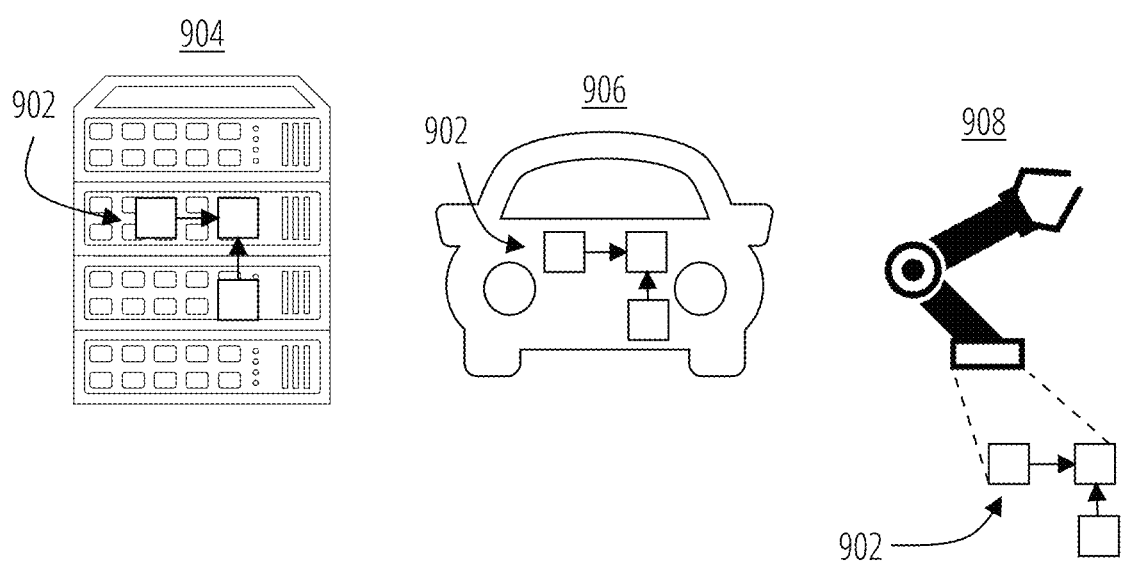
FIG. 9 depicts exemplary applications of a memory system 902 utilizing AFT-ECC and/or IMT.

FIG. 9 depicts exemplary scenarios for use of a memory system 902 utilizing AFT-ECC and/or IMT mechanisms. A memory system 902 may be utilized in a computing system 904, a vehicle 906, and a robot 908, to name just a few examples.

Figure 10:
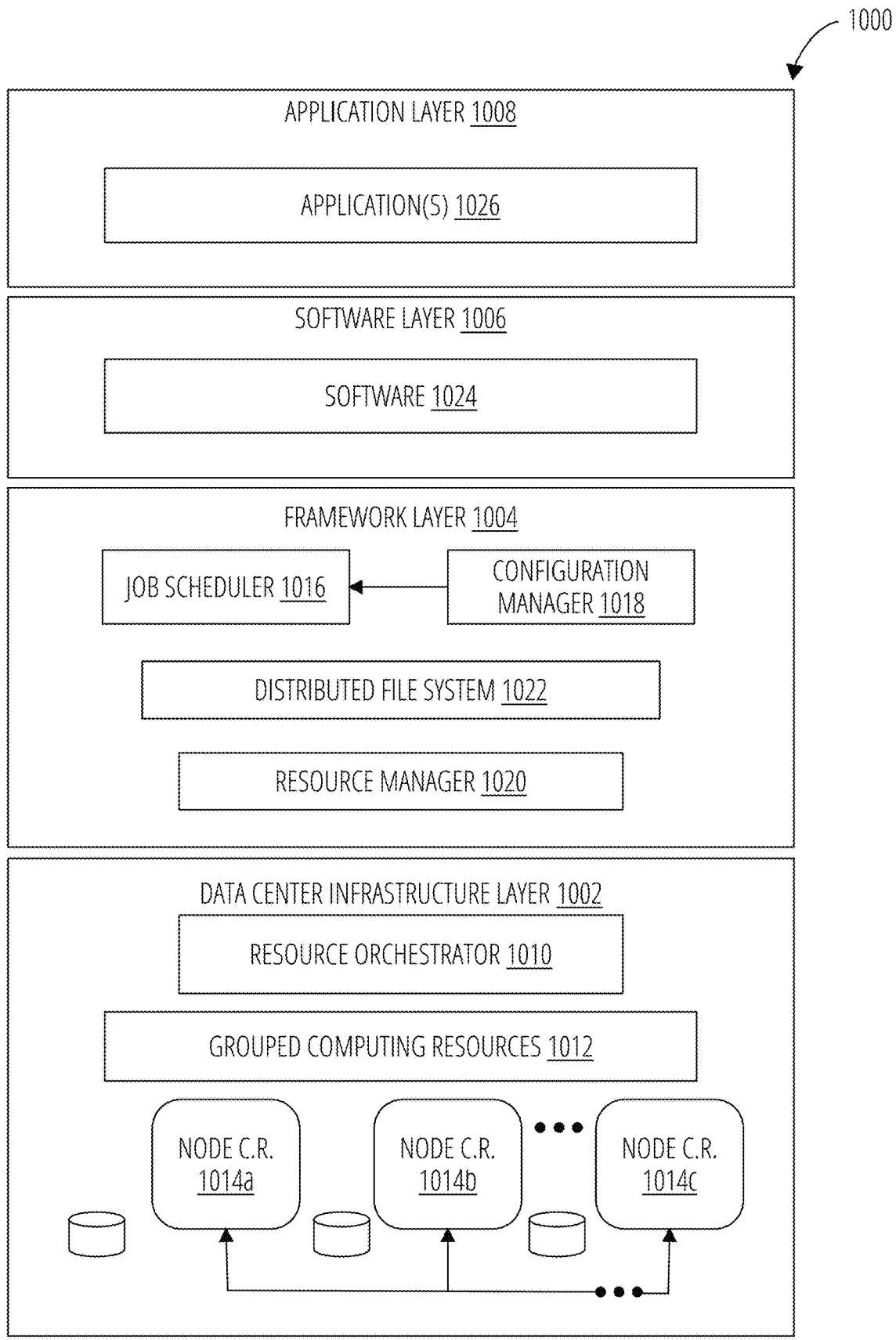
FIG. 10 illustrates an exemplary data center 1000 utilizing AFT-ECC and/or IMT.

FIG. 10 depicts an exemplary data center 1000 embodiment utilizing AFT-ECC and/or IMT mechanisms. In at least one embodiment, data center 1000 includes, without limitation, a data center infrastructure layer 1002, a framework layer 1004, a software layer 1006, and an application layer 1008.

In at least one embodiment, as depicted in FIG. 10, data center infrastructure layer 1002 may include a resource orchestrator 1010, grouped computing resources 1012, and node computing resources (node C.R.s) 1014*a*, 1014*b*, 1014*c*, where "N" represents any whole, positive integer. In at least one embodiment, node computing resources may include, but are not limited to, any number of central processing units (CPUs) or other processors (including accelerators, field programmable gate arrays (FPGAs), graphics processors, etc.), memory devices (e.g., dynamic read-only memory), storage devices (e.g., solid state or disk drives), network input/output (NW I/O) devices, network switches, virtual machines (VMs), power modules, and cooling modules, etc. In at least one embodiment, one or more node computing resources from among node computing resources 1014*a*-1014*c* may be a server having one or more of the above-mentioned computing resources.

In at least one embodiment, grouped computing resources 1012 may include separate groupings of node computing resources housed within one or more racks (not shown), or many racks housed in data centers at various geographical locations (also not shown). Separate groupings of node computing resources within grouped computing resources 1012 may include grouped compute network, a memory hierarchy configured to utilize AFT-ECC and/or IMT mechanisms, and/or storage resources that may be configured or allocated to support one or more workloads. In at least one embodiment, several node computing resources including CPUs or processors may be grouped within one or more racks to provide compute resources to support one or more workloads. In at least one embodiment, one or more racks may also include any number of power modules, cooling modules, and network switches, in any combination.

In at least one embodiment, resource orchestrator 1010 may configure or otherwise control one or more node computing resources 1014*a*-1014*c* and/or grouped computing resources 1012. In at least one embodiment, resource orchestrator 1010 may include a software design infrastructure ("SDI") management entity for data center 1000. In at least one embodiment, resource orchestrator 1010 may include hardware, software, or some combination thereof.

In at least one embodiment, as depicted in FIG. 10, framework layer 1004 includes, without limitation, a job scheduler 1016, a configuration manager 1018, a resource manager 1020, and a distributed file system 1022. In at least one embodiment, framework layer 1004 may include a framework to support software 1024 of software layer 1006 and/or one or more application(s) 1026 of application layer 220. In at least one embodiment, software 1024 or application(s) 1026 may respectively include web-based service software or applications, such as those provided by Amazon Web Services, Google Cloud, and Microsoft Azure. In at least one embodiment, framework layer 1004 may be, but is not limited to, a type of free and open-source software web application framework such as Apache SPARK™ (hereinafter "Spark) that may utilize a distributed file system 1022 for large-scale data processing (e.g., "big data"). In at least one embodiment, job scheduler 1016 may include a Spark driver to facilitate scheduling of workloads supported by various layers of data center 1000. In at least one embodiment, configuration manager 1018 may be capable of configuring different layers such as software layer 1006 and framework layer 1004, including Spark and distributed file system 1022 for supporting large-scale data processing. In at least one embodiment, resource manager 1020 may be capable of managing clustered or grouped computing resources mapped to or allocated for support of distributed file system 1022 and job scheduler 1016. In at least one embodiment, clustered or grouped computing resources may include grouped computing resources 1012 at data center infrastructure layer 1002. In at least one embodiment, resource manager 1020 may coordinate with resource orchestrator 1010 to manage these mapped or allocated computing resources.

In at least one embodiment, software 1024 included in software layer 1006 may include software used by at least portions of node computing resources 1014*a*-1014*c*, grouped computing resources 1012, and/or distributed file system 1022 of framework layer 1004. One or more types of software may include, but are not limited to, Internet web page search software, e-mail virus scan software, database software, and streaming video content software.

In at least one embodiment, application(s) 1026 included in application layer 1008 may include one or more types of applications used by at least portions of node computing resources 1014*a*-1014*c*, grouped computing resources 1012, and/or distributed file system 1022 of framework layer 1004. In at least one or more types of applications may include, without limitation, Compute Unified Device Architecture (CUDA) applications, 5G network applications, artificial intelligence applications, data center applications, and/or variations thereof.

In at least one embodiment, any of configuration manager 1018, resource manager 1020, and resource orchestrator 1010 may implement any number and type of self-modifying actions based on any amount and type of data acquired in any technically feasible fashion. In at least one embodiment, self-modifying actions may relieve a data center operator of data center 1000 from making possibly bad configuration decisions and possibly avoiding underutilized and/or poorly performing portions of a data center.

The AFT-ECC and/or IMT mechanisms disclosed herein may be implemented in systems utilizing one or more graphic processing unit (GPU) and/or general purpose data processor (e.g., a 'central processing unit' i.e. CPU). For example, these mechanisms may be implemented in one or more of a streaming multiprocessor 1400, memory partition unit 1300, parallel processing unit 1102, and parallel processing module 1502 of such systems. Exemplary architectures will now be described that may be configured to implement these mechanisms in such systems.

The following description may use certain acronyms and abbreviations as follows:

"DPC" refers to a "data processing cluster";
"GPC" refers to a "general processing cluster";

"I/O" refers to a "input/output";
"L1 cache" refers to "level one cache";
"L2 cache" refers to "level two cache";
"LSU" refers to a "load/store unit";
"MMU" refers to a "memory management unit";
"MPC" refers to an "M-pipe controller";
"PPU" refers to a "parallel processing unit";
"PROP" refers to a "pre-raster operations unit";
"ROP" refers to a "raster operations";
"SFU" refers to a "special function unit";
"SM" refers to a "streaming multiprocessor";
"Viewport SCC" refers to "viewport scale, cull, and clip";
"WDX" refers to a "work distribution crossbar"; and
"XBar" refers to a "crossbar".

Parallel Processing Unit

Figure 11:
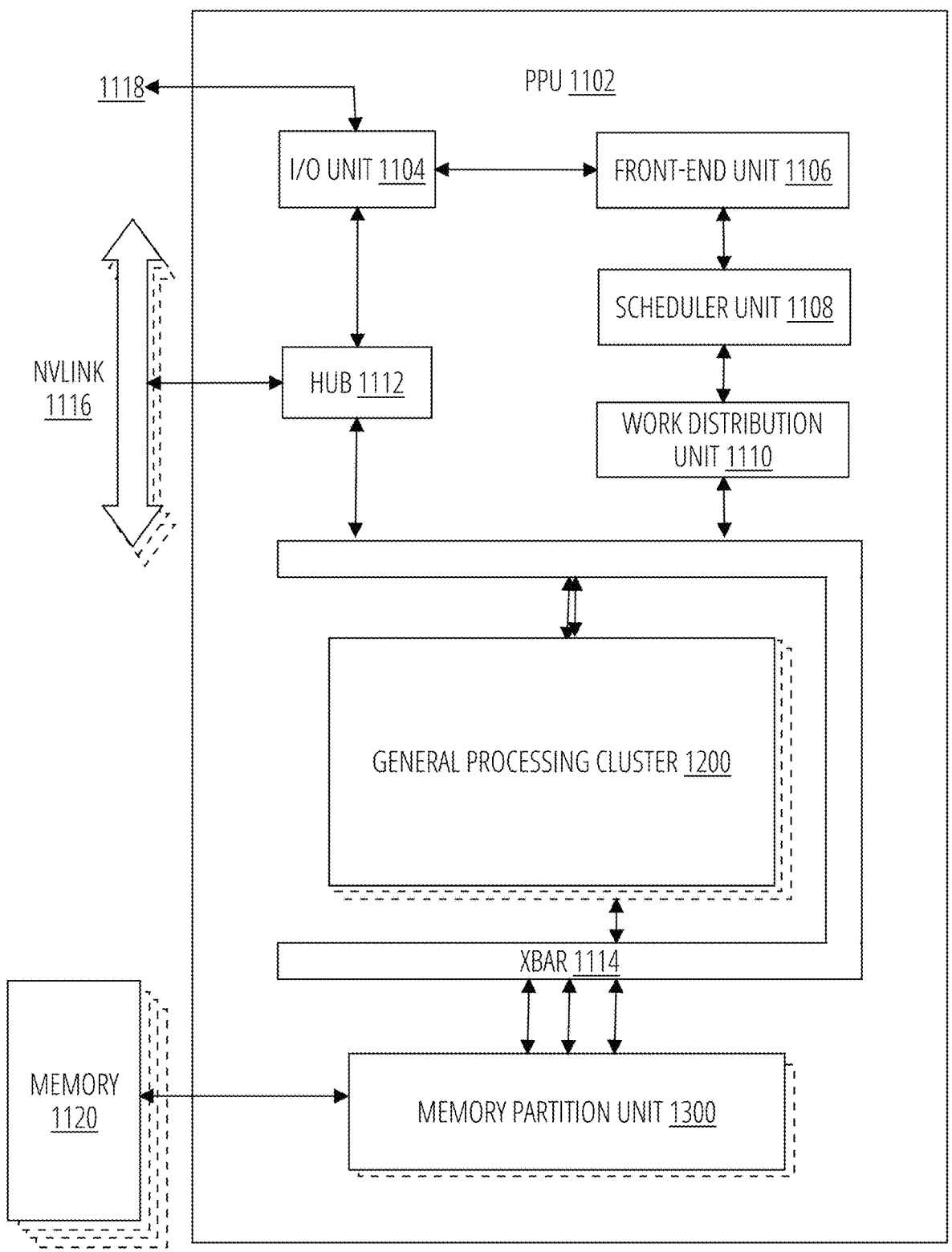
FIG. 11 depicts a parallel processing unit 1102 in accordance with one embodiment.

FIG. 11 depicts a parallel processing unit 1102, in accordance with an embodiment. In an embodiment, the parallel processing unit 1102 is a multi-threaded processor that is implemented on one or more integrated circuit devices. The parallel processing unit 1102 is a latency hiding architecture designed to process many threads in parallel. A thread (e.g., a thread of execution) is an instantiation of a set of instructions configured to be executed by the parallel processing unit 1102. In an embodiment, the parallel processing unit 1102 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the parallel processing unit 1102 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more parallel processing unit 1102 modules may be configured to accelerate thousands of High Performance Computing (HPC), data center, and machine learning applications. The parallel processing unit 1102 may be configured to accelerate numerous deep learning systems and applications including autonomous vehicle platforms, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 11, the parallel processing unit 1102 includes an I/O unit 1104, a front-end unit 1106, a scheduler unit 1108, a work distribution unit 1110, a hub 1112, a crossbar 1114, one or more general processing cluster 1200 modules, and one or more memory partition unit 1300 modules. The parallel processing unit 1102 may be connected to a host processor or other parallel processing unit 1102 modules via one or more high-speed NVLink 1116 interconnects. The parallel processing unit 1102 may be connected to a host processor or other peripheral devices via an interconnect 1118. The parallel processing unit 1102 may also be connected to a local memory comprising a number of memory 1120 devices. In an embodiment, the local memory may comprise a number of dynamic random access memory (DRAM) devices. The DRAM devices may be configured as a high-bandwidth memory (HBM) subsystem, with multiple DRAM dies stacked within each device. The memory 1120 may comprise logic to configure the parallel processing unit 1102 to carry out aspects of the techniques disclosed herein.

The NVLink 1116 interconnect enables systems to scale and include one or more parallel processing unit 1102 modules combined with one or more CPUs, supports cache coherence between the parallel processing unit 1102 modules and CPUs, and CPU mastering. Data and/or commands may be transmitted by the NVLink 1116 through the hub 1112 to/from other units of the parallel processing unit 1102 such as one or more copy engines, a video encoder, a video decoder, a power management unit, etc. (not explicitly shown). The NVLink 1116 is described in more detail in conjunction with FIG. 15.

The I/O unit 1104 is configured to transmit and receive communications (e.g., commands, data, etc.) from a host processor (not shown) over the interconnect 1118. The I/O unit 1104 may communicate with the host processor directly via the interconnect 1118 or through one or more intermediate devices such as a memory bridge. In an embodiment, the I/O unit 1104 may communicate with one or more other processors, such as one or more parallel processing unit 1102 modules via the interconnect 1118. In an embodiment, the I/O unit 1104 implements a Peripheral Component Interconnect Express (PCIe) interface for communications over a PCIe bus and the interconnect 1118 is a PCIe bus. In alternative embodiments, the I/O unit 1104 may implement other types of well-known interfaces for communicating with external devices.

The I/O unit 1104 decodes packets received via the interconnect 1118. In an embodiment, the packets represent commands configured to cause the parallel processing unit 1102 to perform various operations. The I/O unit 1104 transmits the decoded commands to various other units of the parallel processing unit 1102 as the commands may specify. For example, some commands may be transmitted to the front-end unit 1106. Other commands may be transmitted to the hub 1112 or other units of the parallel processing unit 1102 such as one or more copy engines, a video encoder, a video decoder, a power management unit, etc. (not explicitly shown). In other words, the I/O unit 1104 is configured to route communications between and among the various logical units of the parallel processing unit 1102.

In an embodiment, a program executed by the host processor encodes a command stream in a buffer that provides workloads to the parallel processing unit 1102 for processing. A workload may comprise several instructions and data to be processed by those instructions. The buffer is a region in a memory that is accessible (e.g., read/write) by both the host processor and the parallel processing unit 1102. For example, the I/O unit 1104 may be configured to access the buffer in a system memory connected to the interconnect 1118 via memory requests transmitted over the interconnect 1118. In an embodiment, the host processor writes the command stream to the buffer and then transmits a pointer to the start of the command stream to the parallel processing unit 1102. The front-end unit 1106 receives pointers to one or more command streams. The front-end unit 1106 manages the one or more streams, reading commands from the streams and forwarding commands to the various units of the parallel processing unit 1102.

The front-end unit 1106 is coupled to a scheduler unit 1108 that configures the various general processing cluster 1200 modules to process tasks defined by the one or more streams. The scheduler unit 1108 is configured to track state information related to the various tasks managed by the scheduler unit 1108. The state may indicate which general processing cluster 1200 a task is assigned to, whether the task is active or inactive, a priority level associated with the task, and so forth. The scheduler unit 1108 manages the execution of a plurality of tasks on the one or more general processing cluster 1200 modules.

The scheduler unit 1108 is coupled to a work distribution unit 1110 that is configured to dispatch tasks for execution on the general processing cluster 1200 modules. The work distribution unit 1110 may track a number of scheduled tasks received from the scheduler unit 1108. In an embodiment, the work distribution unit 1110 manages a pending task pool and an active task pool for each of the general processing cluster 1200 modules. The pending task pool may comprise a number of slots (e.g., 32 slots) that contain tasks assigned to be processed by a particular general processing cluster 1200. The active task pool may comprise a number of slots (e.g., 4 slots) for tasks that are actively being processed by the general processing cluster 1200 modules. As a general processing cluster 1200 finishes the execution of a task, that task is evicted from the active task pool for the general processing cluster 1200 and one of the other tasks from the pending task pool is selected and scheduled for execution on the general processing cluster 1200. If an active task has been idle on the general processing cluster 1200, such as while waiting for a data dependency to be resolved, then the active task may be evicted from the general processing cluster 1200 and returned to the pending task pool while another task in the pending task pool is selected and scheduled for execution on the general processing cluster 1200.

The work distribution unit 1110 communicates with the one or more general processing cluster 1200 modules via crossbar 1114. The crossbar 1114 is an interconnect network that couples many of the units of the parallel processing unit 1102 to other units of the parallel processing unit 1102. For example, the crossbar 1114 may be configured to couple the work distribution unit 1110 to a particular general processing cluster 1200. Although not shown explicitly, one or more other units of the parallel processing unit 1102 may also be connected to the crossbar 1114 via the hub 1112.

The tasks are managed by the scheduler unit 1108 and dispatched to a general processing cluster 1200 by the work distribution unit 1110. The general processing cluster 1200 is configured to process the task and generate results. The results may be consumed by other tasks within the general processing cluster 1200, routed to a different general processing cluster 1200 via the crossbar 1114, or stored in the memory 1120. The results can be written to the memory 1120 via the memory partition unit 1300 modules, which implement a memory interface for reading and writing data to/from the memory 1120. The results can be transmitted to another parallel processing unit 1102 or CPU via the NVLink 1116. In an embodiment, the parallel processing unit 1102 includes a number U of memory partition unit 1300 modules that is equal to the number of separate and distinct memory 1120 devices coupled to the parallel processing unit 1102. A memory partition unit 1300 will be described in more detail below in conjunction with FIG. 13.

In an embodiment, a host processor executes a driver kernel that implements an application programming interface (API) that enables one or more applications executing on the host processor to schedule operations for execution on the parallel processing unit 1102. In an embodiment, multiple compute applications are simultaneously executed by the parallel processing unit 1102 and the parallel processing unit 1102 provides isolation, quality of service (QoS), and independent address spaces for the multiple compute applications. An application may generate instructions (e.g., API calls) that cause the driver kernel to generate one or more tasks for execution by the parallel processing unit 1102. The driver kernel outputs tasks to one or more streams being processed by the parallel processing unit 1102. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. Threads and cooperating threads are described in more detail in conjunction with FIG. 14.

Figure 12:
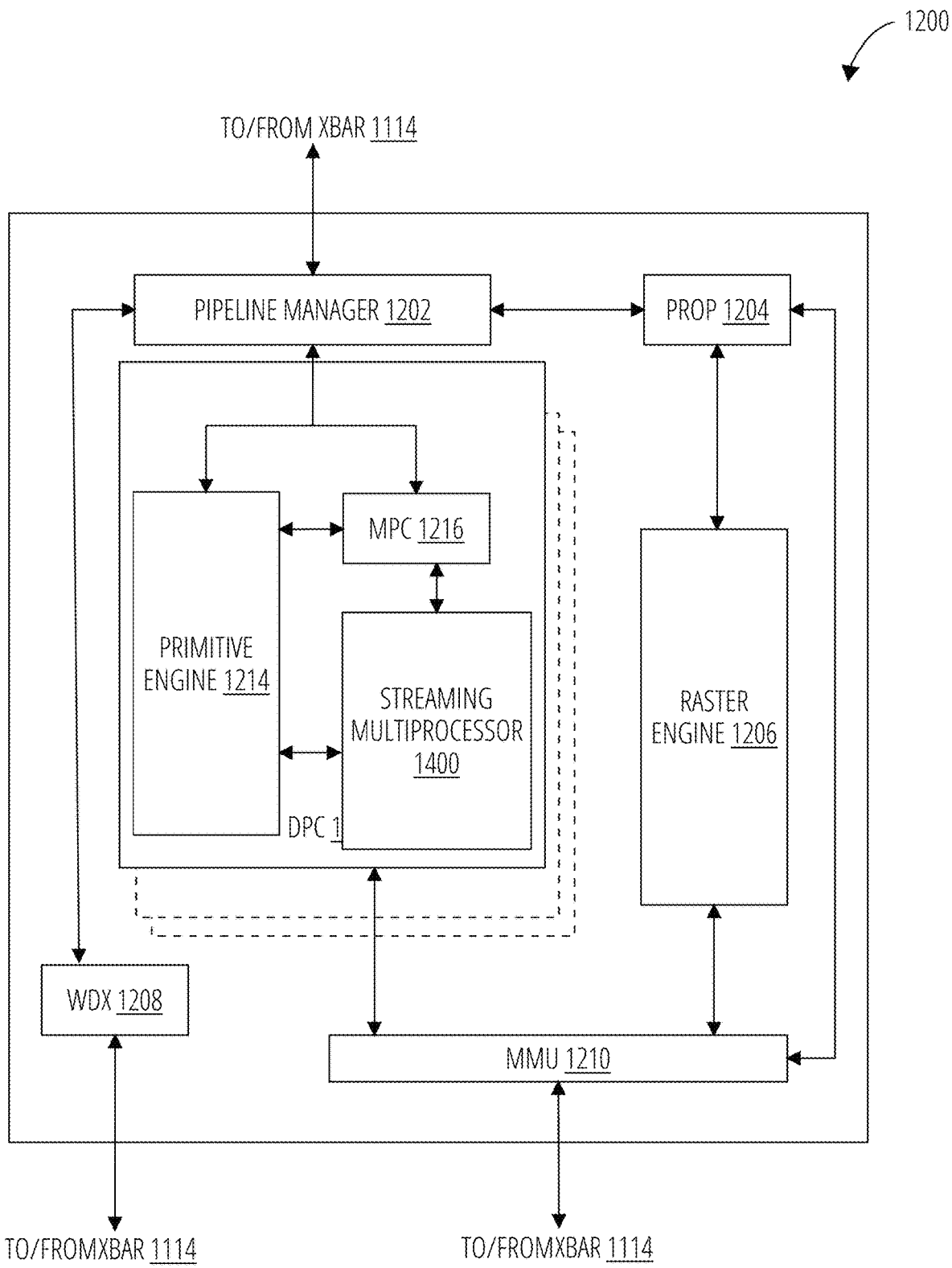
FIG. 12 depicts a general processing cluster 1200 in accordance with one embodiment.

FIG. 12 depicts a general processing cluster 1200 of the parallel processing unit 1102 of FIG. 11, in accordance with an embodiment. As shown in FIG. 12, each general processing cluster 1200 includes a number of hardware units for processing tasks. In an embodiment, each general processing cluster 1200 includes a pipeline manager 1202, a pre-raster operations unit 1204, a raster engine 1206, a work distribution crossbar 1208, a memory management unit 1210, and one or more data processing cluster 1212. It will be appreciated that the general processing cluster 1200 of FIG. 12 may include other hardware units in lieu of or in addition to the units shown in FIG. 12.

In an embodiment, the operation of the general processing cluster 1200 is controlled by the pipeline manager 1202. The pipeline manager 1202 manages the configuration of the one or more data processing cluster 1212 modules for processing tasks allocated to the general processing cluster 1200. In an embodiment, the pipeline manager 1202 may configure at least one of the one or more data processing cluster 1212 modules to implement at least a portion of a graphics rendering pipeline. For example, a data processing cluster 1212 may be configured to execute a vertex shader program on the programmable streaming multiprocessor 1400. The pipeline manager 1202 may also be configured to route packets received from the work distribution unit 1110 to the appropriate logical units within the general processing cluster 1200. For example, some packets may be routed to fixed function hardware units in the pre-raster operations unit 1204 and/or raster engine 1206 while other packets may be routed to the data processing cluster 1212 modules for processing by the primitive engine 1214 or the streaming multiprocessor 1400. In an embodiment, the pipeline manager 1202 may configure at least one of the one or more data processing cluster 1212 modules to implement a neural network model and/or a computing pipeline.

Figure 13:
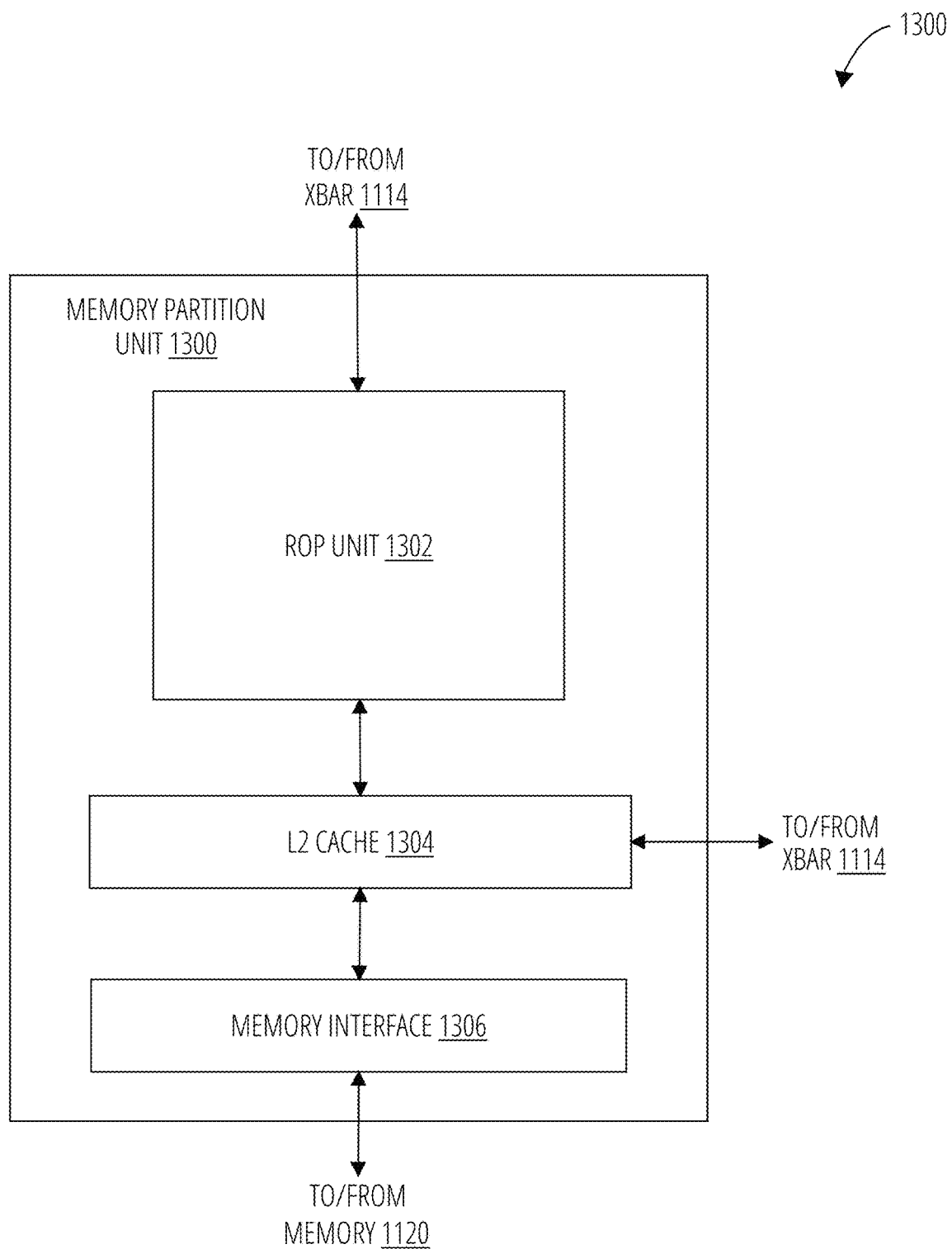
FIG. 13 depicts a memory partition unit 1300 in accordance with one embodiment.

The pre-raster operations unit 1204 is configured to route data generated by the raster engine 1206 and the data processing cluster 1212 modules to a Raster Operations (ROP) unit, described in more detail in conjunction with FIG. 13. The pre-raster operations unit 1204 may also be configured to perform optimizations for color blending, organize pixel data, perform address translations, and the like.

The raster engine 1206 includes a number of fixed function hardware units configured to perform various raster operations. In an embodiment, the raster engine 1206 includes a setup engine, a coarse raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x, y coverage mask for a tile) for the primitive. The output of the coarse raster engine is transmitted to the culling engine where fragments associated with the primitive that fail a z-test are culled, and transmitted to a clipping engine where fragments lying outside a viewing frustum are clipped. Those fragments that survive clipping and culling may be passed to the fine raster engine to generate attributes for the pixel fragments based on the plane equations generated by the setup engine. The output of the raster engine 1206 comprises fragments to be processed, for example, by a fragment shader implemented within a data processing cluster 1212.

Each data processing cluster 1212 included in the general processing cluster 1200 includes an M-pipe controller 1216, a primitive engine 1214, and one or more streaming multiprocessor 1400 modules. The M-pipe controller 1216 controls the operation of the data processing cluster 1212, routing packets received from the pipeline manager 1202 to the appropriate units in the data processing cluster 1212. For example, packets associated with a vertex may be routed to the primitive engine 1214, which is configured to fetch vertex attributes associated with the vertex from the memory 1120. In contrast, packets associated with a shader program may be transmitted to the streaming multiprocessor 1400.

The streaming multiprocessor 1400 comprises a programmable streaming processor that is configured to process tasks represented by a number of threads. Each streaming multiprocessor 1400 is multi-threaded and configured to execute a plurality of threads (e.g., 32 threads) from a particular group of threads concurrently. In an embodiment, the streaming multiprocessor 1400 implements a Single-Instruction, Multiple-Data (SIMD) architecture where each thread in a group of threads (e.g., a warp) is configured to process a different set of data based on the same set of instructions. All threads in the group of threads execute the same instructions. In another embodiment, the streaming multiprocessor 1400 implements a Single-Instruction, Multiple Thread (SIMT) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency. The streaming multiprocessor 1400 will be described in more detail below in conjunction with FIG. 14.

The memory management unit 1210 provides an interface between the general processing cluster 1200 and the memory partition unit 1300. The memory management unit 1210 may provide translation of virtual addresses into physical addresses, memory protection, and arbitration of memory requests. In an embodiment, the memory management unit 1210 provides one or more translation lookaside buffers (TLBs) for performing translation of virtual addresses into physical addresses in the memory 1120.

FIG. 13 depicts a memory partition unit 1300 of the parallel processing unit 1102 of FIG. 11, in accordance with an embodiment. As shown in FIG. 13, the memory partition unit 1300 includes a raster operations unit 1302, a level two cache 1304, and a memory interface 1306. The memory interface 1306 is coupled to the memory 1120. Memory interface 1306 may implement 32, 64, 128, 1024-bit data buses, or the like, for high-speed data transfer. In an embodiment, the parallel processing unit 1102 incorporates U memory interface 1306 modules, one memory interface 1306 per pair of memory partition unit 1300 modules, where each pair of memory partition unit 1300 modules is connected to a corresponding memory 1120 device. For example, parallel processing unit 1102 may be connected to up to Y memory 1120 devices, such as high bandwidth memory stacks or graphics double-data-rate, version 5, synchronous dynamic random access memory, or other types of persistent storage.

In an embodiment, the memory interface 1306 implements an HBM2 memory interface and Y equals half U. In an embodiment, the HBM2 memory stacks are located on the same physical package as the parallel processing unit 1102, providing substantial power and area savings compared with conventional GDDR5 SDRAM systems. In an embodiment, each HBM2 stack includes four memory dies and Y equals 4, with HBM2 stack including two 128-bit channels per die for a total of 8 channels and a data bus width of 1024 bits.

In an embodiment, the memory 1120 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where parallel processing unit 1102 modules process very large datasets and/or run applications for extended periods.

In an embodiment, the parallel processing unit 1102 implements a multi-level memory hierarchy. In an embodiment, the memory partition unit 1300 supports a unified memory to provide a single unified virtual address space for CPU and parallel processing unit 1102 memory, enabling data sharing between virtual memory systems. In an embodiment the frequency of accesses by a parallel processing unit 1102 to memory located on other processors is traced to ensure that memory pages are moved to the physical memory of the parallel processing unit 1102 that is accessing the pages more frequently. In an embodiment, the NVLink 1116 supports address translation services allowing the parallel processing unit 1102 to directly access a CPU's page tables and providing full access to CPU memory by the parallel processing unit 1102.

In an embodiment, copy engines transfer data between multiple parallel processing unit 1102 modules or between parallel processing unit 1102 modules and CPUs. The copy engines can generate page faults for addresses that are not mapped into the page tables. The memory partition unit 1300 can then service the page faults, mapping the addresses into the page table, after which the copy engine can perform the transfer. In a conventional system, memory is pinned (e.g., non-pageable) for multiple copy engine operations between multiple processors, substantially reducing the available memory. With hardware page faulting, addresses can be passed to the copy engines without worrying if the memory pages are resident, and the copy process is transparent.

Data from the memory 1120 or other system memory may be fetched by the memory partition unit 1300 and stored in the level two cache 1304, which is located on-chip and is shared between the various general processing cluster 1200 modules. As shown, each memory partition unit 1300 includes a portion of the level two cache 1304 associated with a corresponding memory 1120 device. Lower level caches may then be implemented in various units within the general processing cluster 1200 modules. For example, each of the streaming multiprocessor 1400 modules may implement an L1 cache. The L1 cache is private memory that is dedicated to a particular streaming multiprocessor 1400. Data from the level two cache 1304 may be fetched and stored in each of the L1 caches for processing in the functional units of the streaming multiprocessor 1400 modules. The level two cache 1304 is coupled to the memory interface 1306 and the crossbar 1114.

The raster operations unit 1302 performs graphics raster operations related to pixel color, such as color compression, pixel blending, and the like. The raster operations unit 1302 also implements depth testing in conjunction with the raster engine 1206, receiving a depth for a sample location associated with a pixel fragment from the culling engine of the raster engine 1206. The depth is tested against a corresponding depth in a depth buffer for a sample location associated with the fragment. If the fragment passes the depth test for the sample location, then the raster operations unit 1302 updates the depth buffer and transmits a result of the depth test to the raster engine 1206. It will be appreciated that the number of partition memory partition unit 1300 modules may be different than the number of general processing cluster 1200 modules and, therefore, each raster operations unit 1302 may be coupled to each of the general processing cluster 1200 modules. The raster operations unit 1302 tracks packets received from the different general processing cluster 1200 modules and determines which general processing cluster 1200 that a result generated by the raster operations unit 1302 is routed to through the crossbar 1114. Although the raster operations unit 1302 is included within the memory partition unit 1300 in FIG. 13, in other embodiment, the raster operations unit 1302 may be outside of the memory partition unit 1300. For example, the raster operations unit 1302 may reside in the general processing cluster 1200 or another unit.

Figure 14:
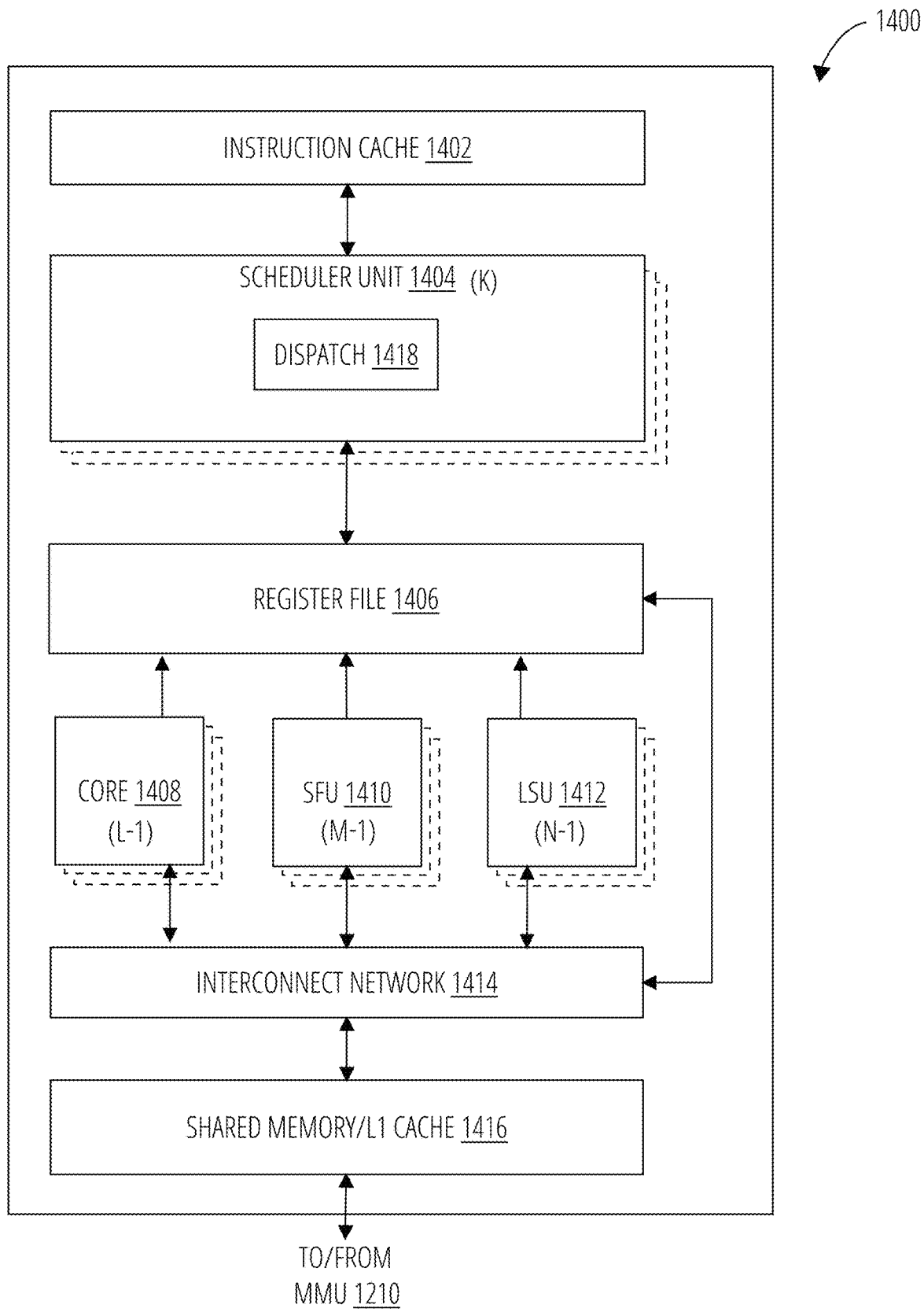
FIG. 14 depicts a streaming multiprocessor 1400 in accordance with one embodiment.

FIG. 14 illustrates the streaming multiprocessor 1400 of FIG. 12, in accordance with an embodiment. As shown in FIG. 14, the streaming multiprocessor 1400 includes an instruction cache 1402, one or more scheduler unit 1404 modules (e.g., such as scheduler unit 1108), a register file 1406, one or more processing core 1408 modules, one or more special function unit 1410 modules, one or more load/store unit 1412 modules, an interconnect network 1414, and a shared memory/L1 cache 1416.

As described above, the work distribution unit 1110 dispatches tasks for execution on the general processing cluster 1200 modules of the parallel processing unit 1102. The tasks are allocated to a particular data processing cluster 1212 within a general processing cluster 1200 and, if the task is associated with a shader program, the task may be allocated to a streaming multiprocessor 1400. The scheduler unit 1108 receives the tasks from the work distribution unit 1110 and manages instruction scheduling for one or more thread blocks assigned to the streaming multiprocessor 1400. The scheduler unit 1404 schedules thread blocks for execution as warps of parallel threads, where each thread block is allocated at least one warp. In an embodiment, each warp executes 32 threads. The scheduler unit 1404 may manage a plurality of different thread blocks, allocating the warps to the different thread blocks and then dispatching instructions from the plurality of different cooperative groups to the various functional units (e.g., core 1408 modules, special function unit 1410 modules, and load/store unit 1412 modules) during each clock cycle.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (e.g., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (e.g., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

A dispatch 1418 unit is configured within the scheduler unit 1404 to transmit instructions to one or more of the functional units. In one embodiment, the scheduler unit 1404 includes two dispatch 1418 units that enable two different instructions from the same warp to be dispatched during each clock cycle. In alternative embodiments, each scheduler unit 1404 may include a single dispatch 1418 unit or additional dispatch 1418 units.

Each streaming multiprocessor 1400 includes a register file 1406 that provides a set of registers for the functional units of the streaming multiprocessor 1400. In an embodiment, the register file 1406 is divided between each of the functional units such that each functional unit is allocated a dedicated portion of the register file 1406. In another embodiment, the register file 1406 is divided between the different warps being executed by the streaming multiprocessor 1400. The register file 1406 provides temporary storage for operands connected to the data paths of the functional units.

Each streaming multiprocessor 1400 comprises L processing core 1408 modules. In an embodiment, the streaming multiprocessor 1400 includes a large number (e.g., 128, etc.) of distinct processing core 1408 modules. Each core 1408 may include a fully-pipelined, single-precision, double-precision, and/or mixed precision processing unit that includes a floating point arithmetic logic unit and an integer arithmetic logic unit. In an embodiment, the floating point arithmetic logic units implement the IEEE 754-2008 standard for floating point arithmetic. In an embodiment, the core 1408 modules include 64 single-precision (32-bit) floating point cores, 64 integer cores, 32 double-precision (64-bit) floating point cores, and 8 tensor cores.

Tensor cores configured to perform matrix operations, and, in an embodiment, one or more tensor cores are included in the core 1408 modules. In particular, the tensor cores are configured to perform deep learning matrix arithmetic, such as convolution operations for neural network training and inferencing. In an embodiment, each tensor core operates on a 4×4 matrix and performs a matrix multiply and accumulate operation D=A'B+C, where A, B, C. and D are 4×4 matrices.

In an embodiment, the matrix multiply inputs A and B are 16-bit floating point matrices, while the accumulation matrices C and D may be 16-bit floating point or 32-bit floating point matrices. Tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each streaming multiprocessor 1400 also comprises M special function unit 1410 modules that perform special functions (e.g., attribute evaluation, reciprocal square root, and the like). In an embodiment, the special function unit 1410 modules may include a tree traversal unit configured to traverse a hierarchical tree data structure. In an embodiment, the special function unit 1410 modules may include texture unit configured to perform texture map filtering operations. In an embodiment, the texture units are configured to load texture maps (e.g., a 2D array of texels) from the memory 1120 and sample the texture maps to produce sampled texture values for use in shader programs executed by the streaming multiprocessor 1400. In an embodiment, the texture maps are stored in the shared memory/L1 cache 1416. The texture units implement texture operations such as filtering operations using mip-maps (e.g., texture maps of varying levels of detail). In an embodiment, each streaming multiprocessor 1400 includes two texture units.

Each streaming multiprocessor 1400 also comprises N load/store unit 1412 modules that implement load and store operations between the shared memory/L1 cache 1416 and the register file 1406. Each streaming multiprocessor 1400 includes an interconnect network 1414 that connects each of the functional units to the register file 1406 and the load/store unit 1412 to the register file 1406 and shared memory/L1 cache 1416. In an embodiment, the interconnect network 1414 is a crossbar that can be configured to connect any of the functional units to any of the registers in the register file 1406 and connect the load/store unit 1412 modules to the register file 1406 and memory locations in shared memory/L1 cache 1416.

The shared memory/L1 cache 1416 is an array of on-chip memory that allows for data storage and communication between the streaming multiprocessor 1400 and the primitive engine 1214 and between threads in the streaming multiprocessor 1400. In an embodiment, the shared memory/L1 cache 1416 comprises 128 KB of storage capacity and is in the path from the streaming multiprocessor 1400 to the memory partition unit 1300. The shared memory/L1 cache 1416 can be used to cache reads and writes. One or more of the shared memory/L1 cache 1416, level two cache 1304, and memory 1120 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory/L1 cache 1416 enables the shared memory/L1 cache 1416 to function as a high-throughput conduit for streaming data while simultaneously providing high-bandwidth and low-latency access to frequently reused data.

When configured for general purpose parallel computation, a simpler configuration can be used compared with graphics processing. Specifically, the fixed function graphics processing units shown in FIG. 11, are bypassed, creating a much simpler programming model. In the general purpose parallel computation configuration, the work distribution unit 1110 assigns and distributes blocks of threads directly to the data processing cluster 1212 modules. The threads in a block execute the same program, using a unique thread ID in the calculation to ensure each thread generates unique results, using the streaming multiprocessor 1400 to execute the program and perform calculations, shared memory/L1 cache 1416 to communicate between threads, and the load/store unit 1412 to read and write global memory through the shared memory/L1 cache 1416 and the memory partition unit 1300. When configured for general purpose parallel computation, the streaming multiprocessor 1400 can also write commands that the scheduler unit 1108 can use to launch new work on the data processing cluster 1212 modules.

The parallel processing unit 1102 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the parallel processing unit 1102 is embodied on a single semiconductor substrate. In another embodiment, the parallel processing unit 1102 is included in a system-on-a-chip (SoC) along with one or more other devices such as additional parallel processing unit 1102 modules, the memory 1120, a reduced instruction set computer (RISC) CPU, a memory management unit (MMU), a digital-to-analog converter (DAC), and the like.

In an embodiment, the parallel processing unit 1102 may be included on a graphics card that includes one or more memory devices. The graphics card may be configured to interface with a PCIe slot on a motherboard of a desktop computer. In yet another embodiment, the parallel processing unit 1102 may be an integrated graphics processing unit (iGPU) or parallel processor included in the chipset of the motherboard.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 15:
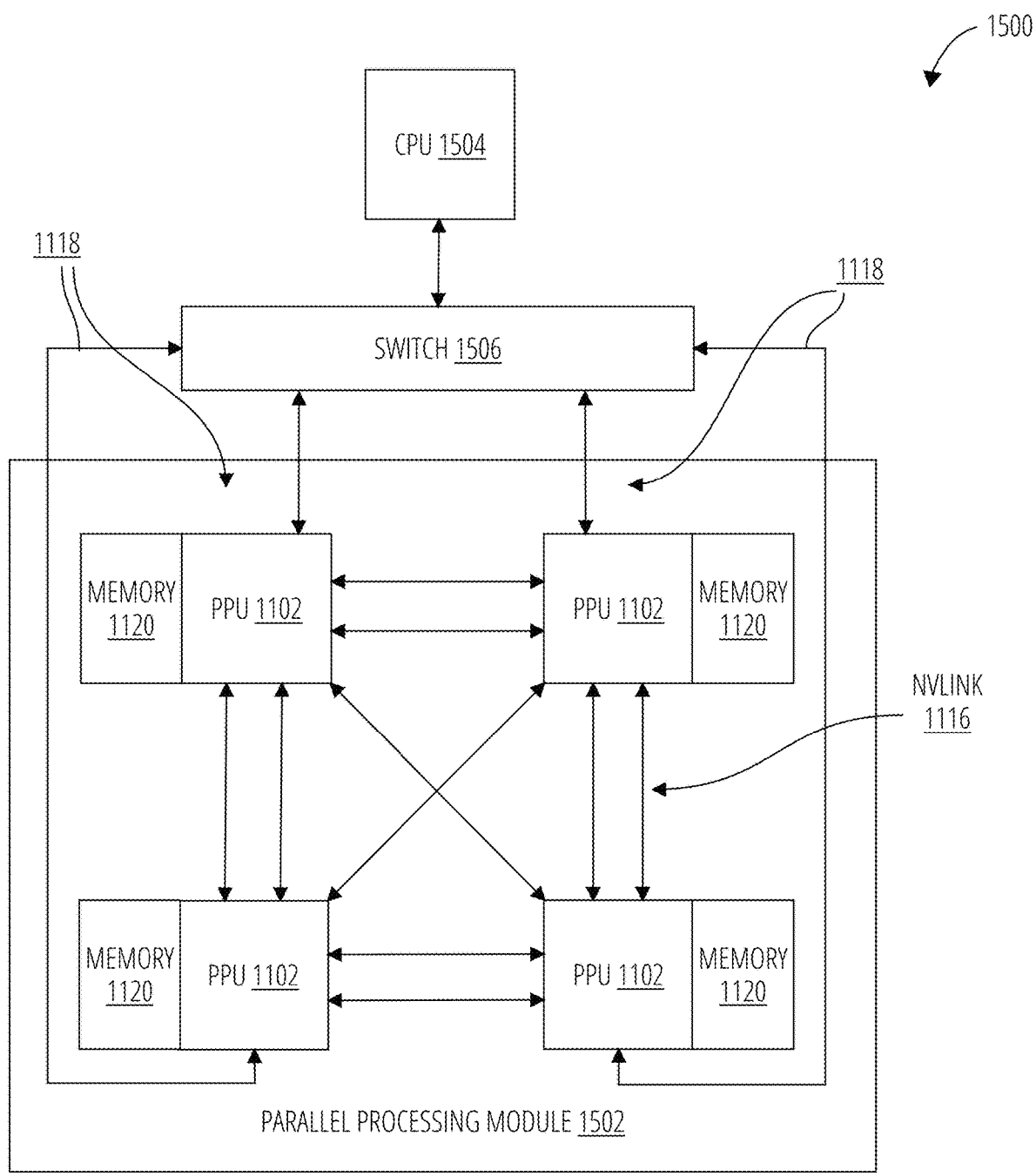
FIG. 15 depicts a processing system 1500 in accordance with one embodiment.

FIG. 15 is a conceptual diagram of a processing system 1500 implemented using the parallel processing unit 1102 of FIG. 11, in accordance with an embodiment. The processing system 1500 includes a central processing unit 1504, switch 1506, and multiple parallel processing unit 1102 modules each and respective memory 1120 modules. The NVLink 1116 provides high-speed communication links between each of the parallel processing unit 1102 modules. Although a particular number of NVLink 1116 and interconnect 1118 connections are illustrated in FIG. 15, the number of connections to each parallel processing unit 1102 and the central processing unit 1504 may vary. The switch 1506 interfaces between the interconnect 1118 and the central processing unit 1504. The parallel processing unit 1102 modules, memory 1120 modules, and NVLink 1116 connections may be situated on a single semiconductor platform to form a parallel processing module 1502. In an embodiment, the switch 1506 supports two or more protocols to interface between various different connections and/or links.

In another embodiment (not shown), the NVLink 1116 provides one or more high-speed communication links between each of the parallel processing unit modules (parallel processing unit 1102, parallel processing unit 1102, parallel processing unit 1102, and parallel processing unit 1102) and the central processing unit 1504 and the switch 1506 interfaces between the interconnect 1118 and each of the parallel processing unit modules. The parallel processing unit modules, memory 1120 modules, and interconnect 1118 may be situated on a single semiconductor platform to form a parallel processing module 1502. In yet another embodiment (not shown), the interconnect 1118 provides one or more communication links between each of the parallel processing unit modules and the central processing unit 1504 and the switch 1506 interfaces between each of the parallel processing unit modules using the NVLink 1116 to provide one or more high-speed communication links between the parallel processing unit modules. In another embodiment (not shown), the NVLink 1116 provides one or more high-speed communication links between the parallel processing unit modules and the central processing unit 1504 through the switch 1506. In yet another embodiment (not shown), the interconnect 1118 provides one or more communication links between each of the parallel processing unit modules directly. One or more of the NVLink 1116 high-speed communication links may be implemented as a physical NVLink interconnect or either an on-chip or on-die interconnect using the same protocol as the NVLink 1116.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 1502 may be implemented as a circuit board substrate and each of the parallel processing unit modules and/or memory 1120 modules may be packaged devices. In an embodiment, the central processing unit 1504, switch 1506, and the parallel processing module 1502 are situated on a single semiconductor platform.

In an embodiment, the signaling rate of each NVLink 1116 is 20 to 25 Gigabits/second and each parallel processing unit module includes six NVLink 1116 interfaces (as shown in FIG. 15, five NVLink 1116 interfaces are included for each parallel processing unit module). Each NVLink 1116 provides a data transfer rate of 25 Gigabytes/second in each direction, with six links providing 300 Gigabytes/second. The NVLink 1116 can be used exclusively for PPU-to-PPU communication as shown in FIG. 15, or some combination of PPU-to-PPU and PPU-to-CPU, when the central processing unit 1504 also includes one or more NVLink 1116 interfaces.

In an embodiment, the NVLink 1116 allows direct load/store/atomic access from the central processing unit 1504 to each parallel processing unit module's memory 1120. In an embodiment, the NVLink 1116 supports coherency operations, allowing data read from the memory 1120 modules to be stored in the cache hierarchy of the central processing unit 1504, reducing cache access latency for the central processing unit 1504. In an embodiment, the NVLink 1116 includes support for Address Translation Services (ATS), enabling the parallel processing unit module to directly access page tables within the central processing unit 1504. One or more of the NVLink 1116 may also be configured to operate in a low-power mode.

Figure 16:
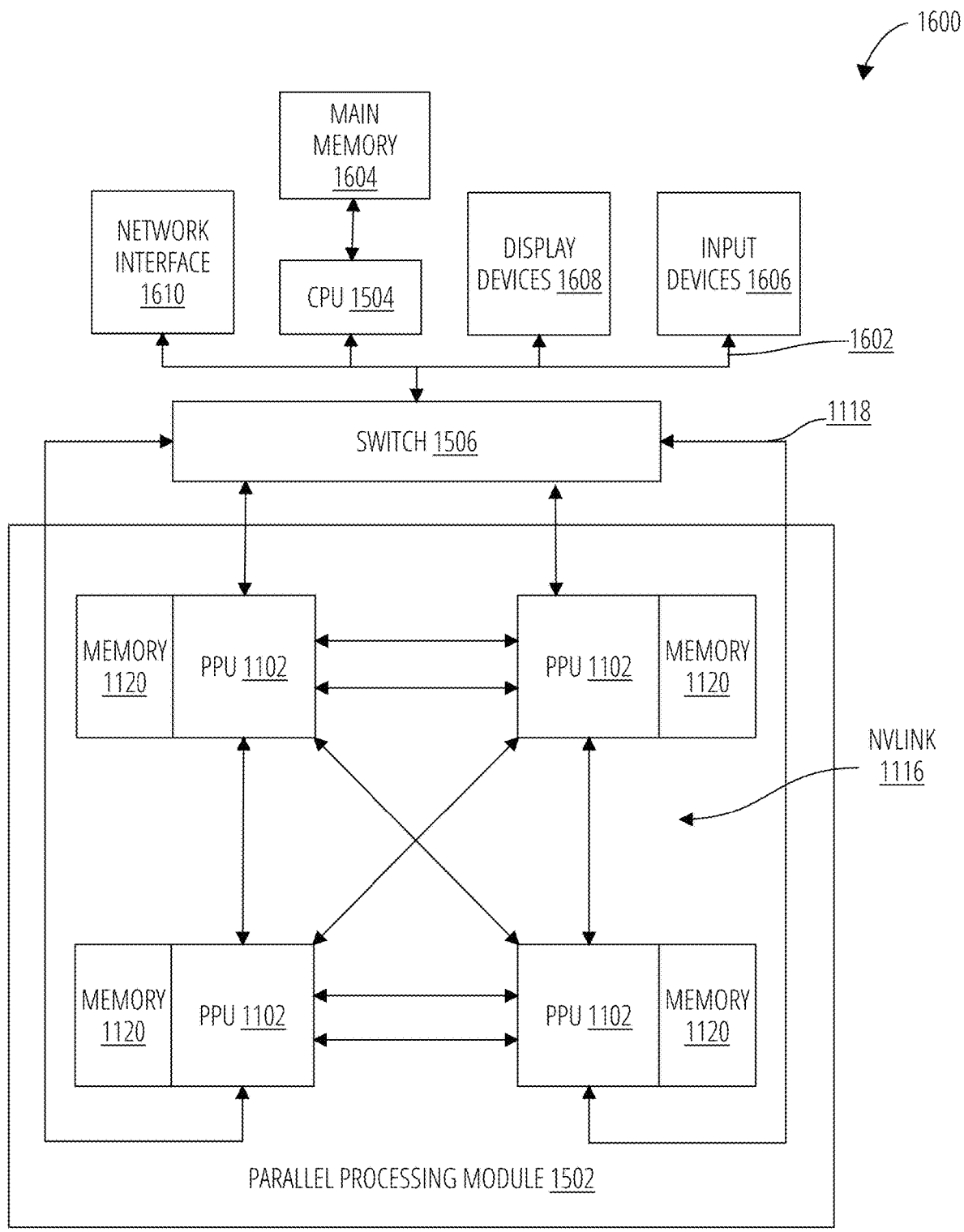
FIG. 16 depicts an exemplary processing system 1600 in accordance with another embodiment.

FIG. 16 depicts an exemplary processing system 1600 in which the various architecture and/or functionality of the various previous embodiments may be implemented. As shown, an exemplary processing system 1600 is provided including at least one central processing unit 1504 that is connected to a communications bus 1602. The communication communications bus 1602 may be implemented using any suitable protocol, such as PCI (Peripheral Component Interconnect), PCI-Express, AGP (Accelerated Graphics Port), HyperTransport, or any other bus or point-to-point communication protocol(s). The exemplary processing system 1600 also includes a main memory 1604. Control logic (software) and data are stored in the main memory 1604 which may take the form of random access memory (RAM).

The exemplary processing system 1600 also includes input devices 1606, the parallel processing module 1502, and display devices 1608, e.g. a conventional CRT (cathode ray tube), LCD (liquid crystal display), LED (light emitting diode), plasma display or the like. User input may be received from the input devices 1606, e.g., keyboard, mouse, touchpad, microphone, and the like. Each of the foregoing modules and/or devices may even be situated on a single semiconductor platform to form the exemplary processing system 1600. Alternately, the various modules may also be situated separately or in various combinations of semiconductor platforms per the desires of the user.

Further, the exemplary processing system 1600 may be coupled to a network (e.g., a telecommunications network, local area network (LAN), wireless network, wide area network (WAN) such as the Internet, peer-to-peer network, cable network, or the like) through a network interface 1610 for communication purposes.

The exemplary processing system 1600 may also include a secondary storage (not shown). The secondary storage includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 1604 and/or the secondary storage. Such computer programs, when executed, enable the exemplary processing system 1600 to perform various functions. The main memory 1604, the storage, and/or any other storage are possible examples of computer-readable media.

The architecture and/or functionality of the various previous figures may be implemented in the context of a general computer system, a circuit board system, a game console system dedicated for entertainment purposes, an application-specific system, and/or any other desired system. For example, the exemplary processing system 1600 may take the form of a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, a mobile phone device, a television, workstation, game consoles, embedded system, and/or any other type of logic.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Graphics Processing Pipeline

Figure 17:
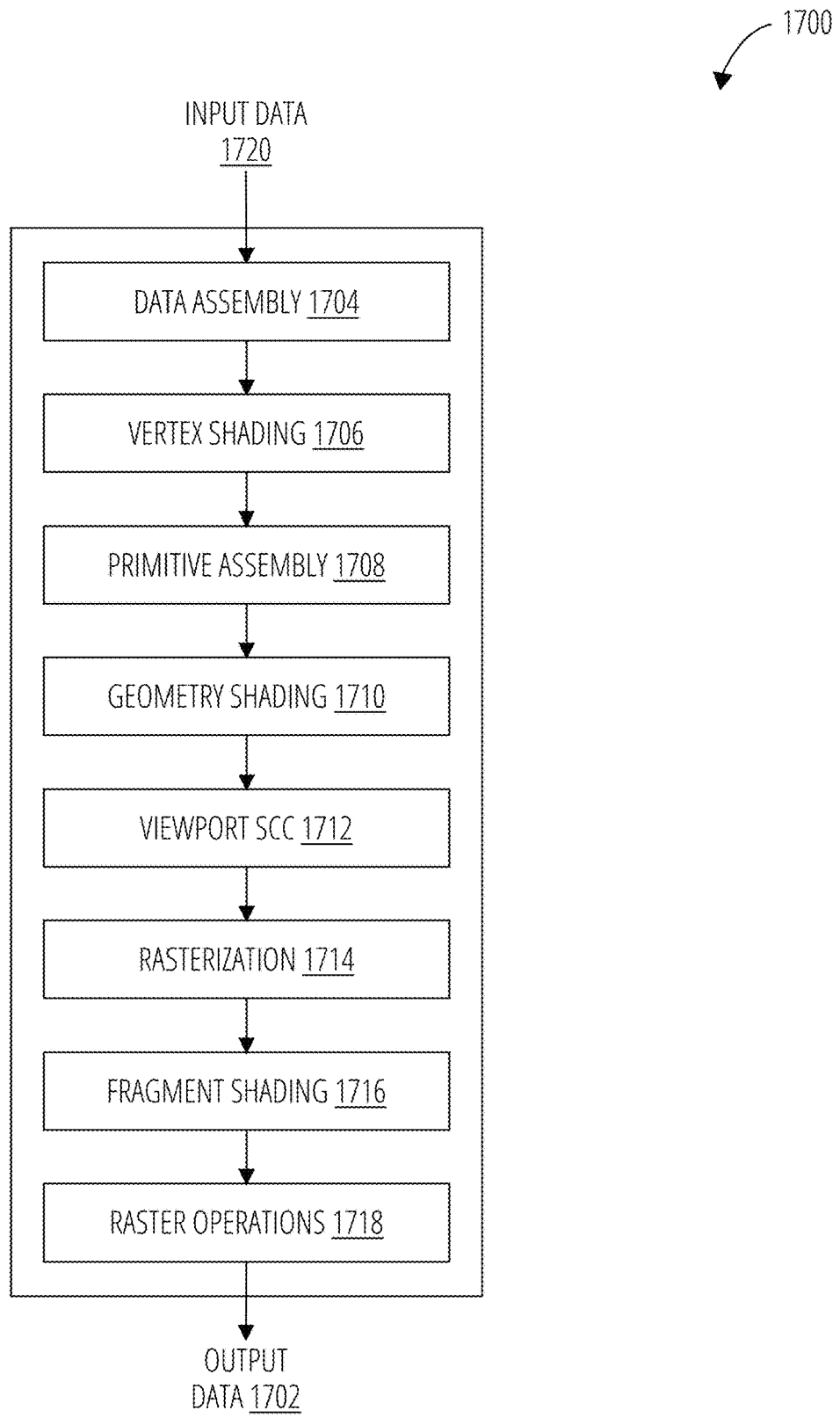
FIG. 17 depicts a graphics processing pipeline 1700 in accordance with one embodiment.

FIG. 17 is a conceptual diagram of a graphics processing pipeline 1700 implemented by the parallel processing unit 1102 of FIG. 11, in accordance with an embodiment. In an embodiment, the parallel processing unit 1102 comprises a graphics processing unit (GPU). The parallel processing unit 1102 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The parallel processing unit 1102 can be configured to process the graphics primitives to generate a frame buffer (e.g., pixel data for each of the pixels of the display).

An application writes model data for a scene (e.g., a collection of vertices and attributes) to a memory such as a system memory or memory 1120. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the streaming multiprocessor 1400 modules of the parallel processing unit 1102 including one or more of a vertex shader, hull shader, domain shader, geometry shader, and a pixel shader. For example, one or more of the streaming multiprocessor 1400 modules may be configured to execute a vertex shader program that processes a number of vertices defined by the model data. In an embodiment, the different streaming multiprocessor 1400 modules may be configured to execute different shader programs concurrently. For example, a first subset of streaming multiprocessor 1400 modules may be configured to execute a vertex shader program while a second subset of streaming multiprocessor 1400 modules may be configured to execute a pixel shader program. The first subset of streaming multiprocessor 1400 modules processes vertex data to produce processed vertex data and writes the processed vertex data to the level two cache 1304 and/or the memory 1120. After the processed vertex data is rasterized (e.g., transformed from three-dimensional data into two-dimensional data in screen space) to produce fragment data, the second subset of streaming multiprocessor 1400 modules executes a pixel shader to produce processed fragment data, which is then blended with other processed fragment data and written to the frame buffer in memory 1120. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

The graphics processing pipeline 1700 is an abstract flow diagram of the processing steps implemented to generate 2D computer-generated images from 3D geometry data. As is well-known, pipeline architectures may perform long latency operations more efficiently by splitting up the operation into a plurality of stages, where the output of each stage is coupled to the input of the next successive stage. Thus, the graphics processing pipeline 1700 receives input data 601 that is transmitted from one stage to the next stage of the graphics processing pipeline 1700 to generate output data 1702. In an embodiment, the graphics processing pipeline 1700 may represent a graphics processing pipeline defined by the OpenGL® API. As an option, the graphics processing pipeline 1700 may be implemented in the context of the functionality and architecture of the previous Figures and/or any subsequent Figure(s).

As shown in FIG. 17, the graphics processing pipeline 1700 comprises a pipeline architecture that includes a number of stages. The stages include, but are not limited to, a data assembly 1704 stage, a vertex shading 1706 stage, a primitive assembly 1708 stage, a geometry shading 1710 stage, a viewport SCC 1712 stage, a rasterization 1714 stage, a fragment shading 1716 stage, and a raster operations 1718 stage. In an embodiment, the input data 1720 comprises commands that configure the processing units to implement the stages of the graphics processing pipeline 1700 and geometric primitives (e.g., points, lines, triangles, quads, triangle strips or fans, etc.) to be processed by the stages. The output data 1702 may comprise pixel data (e.g., color data) that is copied into a frame buffer or other type of surface data structure in a memory.

The data assembly 1704 stage receives the input data 1720 that specifies vertex data for high-order surfaces, primitives, or the like. The data assembly 1704 stage collects the vertex data in a temporary storage or queue, such as by receiving a command from the host processor that includes a pointer to a buffer in memory and reading the vertex data from the buffer. The vertex data is then transmitted to the vertex shading 1706 stage for processing.

The vertex shading 1706 stage processes vertex data by performing a set of operations (e.g., a vertex shader or a program) once for each of the vertices. Vertices may be, e.g., specified as a 4-coordinate vector (e.g., <x, y, z, w>) associated with one or more vertex attributes (e.g., color, texture coordinates, surface normal, etc.). The vertex shading 1706 stage may manipulate individual vertex attributes such as position, color, texture coordinates, and the like. In other words, the vertex shading 1706 stage performs operations on the vertex coordinates or other vertex attributes associated with a vertex. Such operations commonly including lighting operations (e.g., modifying color attributes for a vertex) and transformation operations (e.g., modifying the coordinate space for a vertex). For example, vertices may be specified using coordinates in an object-coordinate space, which are transformed by multiplying the coordinates by a matrix that translates the coordinates from the object-coordinate space into a world space or a normalized-device-coordinate (NCD) space. The vertex shading 1706 stage generates transformed vertex data that is transmitted to the primitive assembly 1708 stage.

The primitive assembly 1708 stage collects vertices output by the vertex shading 1706 stage and groups the vertices into geometric primitives for processing by the geometry shading 1710 stage. For example, the primitive assembly 1708 stage may be configured to group every three consecutive vertices as a geometric primitive (e.g., a triangle) for transmission to the geometry shading 1710 stage. In some embodiments, specific vertices may be reused for consecutive geometric primitives (e.g., two consecutive triangles in a triangle strip may share two vertices). The primitive assembly 1708 stage transmits geometric primitives (e.g., a collection of associated vertices) to the geometry shading 1710 stage.

The geometry shading 1710 stage processes geometric primitives by performing a set of operations (e.g., a geometry shader or program) on the geometric primitives. Tessellation operations may generate one or more geometric primitives from each geometric primitive. In other words, the geometry shading 1710 stage may subdivide each geometric primitive into a finer mesh of two or more geometric primitives for processing by the rest of the graphics processing pipeline 1700. The geometry shading 1710 stage transmits geometric primitives to the viewport SCC 1712 stage.

In an embodiment, the graphics processing pipeline 1700 may operate within a streaming multiprocessor and the vertex shading 1706 stage, the primitive assembly 1708 stage, the geometry shading 1710 stage, the fragment shading 1716 stage, and/or hardware/software associated therewith, may sequentially perform processing operations. Once the sequential processing operations are complete, in an embodiment, the viewport SCC 1712 stage may utilize the data. In an embodiment, primitive data processed by one or more of the stages in the graphics processing pipeline 1700 may be written to a cache (e.g. L1 cache, a vertex cache, etc.). In this case, in an embodiment, the viewport SCC 1712 stage may access the data in the cache. In an embodiment, the viewport SCC 1712 stage and the rasterization 1714 stage are implemented as fixed function circuitry.

The viewport SCC 1712 stage performs viewport scaling, culling, and clipping of the geometric primitives. Each surface being rendered to is associated with an abstract camera position. The camera position represents a location of a viewer looking at the scene and defines a viewing frustum that encloses the objects of the scene. The viewing frustum may include a viewing plane, a rear plane, and four clipping planes. Any geometric primitive entirely outside of the viewing frustum may be culled (e.g., discarded) because the geometric primitive will not contribute to the final rendered scene. Any geometric primitive that is partially inside the viewing frustum and partially outside the viewing frustum may be clipped (e.g., transformed into a new geometric primitive that is enclosed within the viewing frustum. Furthermore, geometric primitives may each be scaled based on a depth of the viewing frustum. All potentially visible geometric primitives are then transmitted to the rasterization 1714 stage.

The rasterization 1714 stage converts the 3D geometric primitives into 2D fragments (e.g. capable of being utilized for display, etc.). The rasterization 1714 stage may be configured to utilize the vertices of the geometric primitives to setup a set of plane equations from which various attributes can be interpolated. The rasterization 1714 stage may also compute a coverage mask for a plurality of pixels that indicates whether one or more sample locations for the pixel intercept the geometric primitive. In an embodiment, z-testing may also be performed to determine if the geometric primitive is occluded by other geometric primitives that have already been rasterized. The rasterization 1714 stage generates fragment data (e.g., interpolated vertex attributes associated with a particular sample location for each covered pixel) that are transmitted to the fragment shading 1716 stage.

The fragment shading 1716 stage processes fragment data by performing a set of operations (e.g., a fragment shader or a program) on each of the fragments. The fragment shading 1716 stage may generate pixel data (e.g., color values) for the fragment such as by performing lighting operations or sampling texture maps using interpolated texture coordinates for the fragment. The fragment shading 1716 stage generates pixel data that is transmitted to the raster operations 1718 stage.

The raster operations 1718 stage may perform various operations on the pixel data such as performing alpha tests, stencil tests, and blending the pixel data with other pixel data corresponding to other fragments associated with the pixel. When the raster operations 1718 stage has finished processing the pixel data (e.g., the output data 1702), the pixel data may be written to a render target such as a frame buffer, a color buffer, or the like.

It will be appreciated that one or more additional stages may be included in the graphics processing pipeline 1700 in addition to or in lieu of one or more of the stages described above. Various implementations of the abstract graphics processing pipeline may implement different stages. Furthermore, one or more of the stages described above may be excluded from the graphics processing pipeline in some embodiments (such as the geometry shading 1710 stage). Other types of graphics processing pipelines are contemplated as being within the scope of the present disclosure. Furthermore, any of the stages of the graphics processing pipeline 1700 may be implemented by one or more dedicated hardware units within a graphics processor such as parallel processing unit 1102. Other stages of the graphics processing pipeline 1700 may be implemented by programmable hardware units such as the streaming multiprocessor 1400 of the parallel processing unit 1102.

The graphics processing pipeline 1700 may be implemented via an application executed by a host processor, such as a CPU. In an embodiment, a device driver may implement an application programming interface (API) that defines various functions that can be utilized by an application in order to generate graphical data for display. The device driver is a software program that includes a plurality of instructions that control the operation of the parallel processing unit 1102. The API provides an abstraction for a programmer that lets a programmer utilize specialized graphics hardware, such as the parallel processing unit 1102, to generate the graphical data without requiring the programmer to utilize the specific instruction set for the parallel processing unit 1102. The application may include an API call that is routed to the device driver for the parallel processing unit 1102. The device driver interprets the API call and performs various operations to respond to the API call. In some instances, the device driver may perform operations by executing instructions on the CPU. In other instances, the device driver may perform operations, at least in part, by launching operations on the parallel processing unit 1102 utilizing an input/output interface between the CPU and the parallel processing unit 1102. In an embodiment, the device driver is configured to implement the graphics processing pipeline 1700 utilizing the hardware of the parallel processing unit 1102.

Various programs may be executed within the parallel processing unit 1102 in order to implement the various stages of the graphics processing pipeline 1700. For example, the device driver may launch a kernel on the parallel processing unit 1102 to perform the vertex shading 1706 stage on one streaming multiprocessor 1400 (or multiple streaming multiprocessor 1400 modules). The device driver (or the initial kernel executed by the parallel processing unit 1102) may also launch other kernels on the parallel processing unit 1102 to perform other stages of the graphics processing pipeline 1700, such as the geometry shading 1710 stage and the fragment shading 1716 stage. In addition, some of the stages of the graphics processing pipeline 1700 may be implemented on fixed unit hardware such as a rasterizer or a data assembler implemented within the parallel processing unit 1102. It will be appreciated that results from one kernel may be processed by one or more intervening fixed function hardware units before being processed by a subsequent kernel on a streaming multiprocessor 1400.

LISTING OF DRAWING ELEMENTS 102 graphics processing unit
104 system memory
106 DRAM
108 DRAM
110 DRAM
112 level 2 cache slice
114 level 2 cache slice
116 level 2 cache slice
118 level 2 cache
120 SM
122 SM
124 crossbar switch
126 level 1 cache
128 level 1 cache
130 register file
132 register file
202 codeword generator
204 codeword decoder
302 error handling logic
402 set of all data error syndromes
404 column space of TTS
406 tag sub-matrix
408 data and identity sub-matrices
410 all-0 syndrome
412 multi-bit error syndromes
602 tag sub-matrix
604 tag sub-matrix
606 tag size configuration logic
702 codeword decoder
704 codeword generator
706 codeword decoder
708 codeword generator
802 coalescer
804 load/store unit
806 miss-status holding register
902 memory system
904 computing system
906 vehicle
908 robot
1000 data center
1002 data center infrastructure layer
1004 framework layer
1006 software layer
1008 application layer
1010 resource orchestrator
1012 grouped computing resources
1014a node computing resource
1014b node computing resource
1014c node computing resource
1016 job scheduler
1018 configuration manager
1020 resource manager
1022 distributed file system
1024 software
1026 application(s)
1102 parallel processing unit
1104 I/O unit
1106 front-end unit
1108 scheduler unit
1110 work distribution unit
1112 hub
1114 crossbar
1116 NVLink
1118 interconnect
1120 memory
1200 general processing cluster
1202 pipeline manager
1204 pre-raster operations unit
1206 raster engine
1208 work distribution crossbar
1210 memory management unit
1212 data processing cluster
1214 primitive engine
1216 M-pipe controller
1300 memory partition unit
1302 raster operations unit
1304 level two cache
1306 memory interface
1400 streaming multiprocessor
1402 instruction cache
1404 scheduler unit
1406 register file
1408 core
1410 special function unit
1412 load/store unit
1414 interconnect network
1416 shared memory/L1 cache
1418 dispatch
1500 processing system
1502 parallel processing module
1504 central processing unit
1506 switch
1600 exemplary processing system
1602 communications bus
1604 main memory
1606 input devices
1608 display devices
1610 network interface
1700 graphics processing pipeline
1702 output data
1704 data assembly
1706 vertex shading
1708 primitive assembly
1710 geometry shading
1712 viewport SCC
1714 rasterization
1716 fragment shading
1718 raster operations
1720 input data Various functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on. "Logic" refers to machine memory circuits and non-transitory machine readable media comprising machine-executable instructions (software and firmware), and/or circuitry (hardware) which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter). Logic symbols in the drawings should be understood to have their ordinary interpretation in the art in terms of functionality and various structures that may be utilized for their implementation, unless otherwise indicated.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, claims in this application that do not otherwise include the "means for" [performing a function] construct should not be interpreted under 35 U.S.C § 112(f).

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Having thus described illustrative embodiments in detail, it will be apparent that modifications and variations are possible without departing from the scope of the invention as claimed. The scope of inventive subject matter is not limited to the depicted embodiments but is rather set forth in the following Claims.

What is claimed is:

1. A device comprising:
   a first memory;
   decoding logic configured to operate on codewords stored in the first memory, the decoding logic comprising a second memory configured with a tag matrix comprising all-even-weight columns and a parity-check matrix comprising all-odd-weight columns.

2. The device of claim 1, wherein the columns of the parity-check matrix comprise Hsiao codes.

3. The device of claim 1, wherein the tag matrix comprises all weight-2 columns.

4. The device of claim 1, wherein a number of 1s is minimized in the tag matrix.

5. The device of claim 1, wherein a maximum number of 1s per row is minimized in the tag matrix.

6. The device of claim 1, wherein the columns of the tag matrix are configured into a sorted order.

7. The device of claim 1, further comprising:
logic to configure a tag size by configuring an operative sub-set of one or both of the columns and rows of the tag matrix.

8. A machine memory system comprising:
a memory channel configured to move a data value from a main memory to a data processor;
an encoder disposed along the memory channel to generate a codeword for the data value, the codeword comprising an alias-free-tagged error-correcting code (AFT-ECC);
logic to associate a pointer tag with a memory pointer to the data value; and
a decoder to utilize the AFT-ECC to both check the data value for corruption and to check the memory pointer for a memory access violation.

9. The machine memory system of claim 8, wherein the AFT-ECC comprises a memory tag for a range of addresses associated with the memory pointer.

10. The machine memory system of claim 8, wherein the memory channel traverses at least a first level cache memory and a second level cache memory.

11. The machine memory system of claim 8, wherein the memory channel is configured such that the codeword is decoded exclusively upon retrieval from a Level 1 cache.

12. The machine memory system of claim 8, wherein the memory channel is configured such that the data value is encoded exclusively upon being stored at or below a Level 1 cache.

13. The machine memory system of claim 8, wherein the encoder and the decoder are configured to input the pointer tag.

14. The machine memory system of claim 13, wherein the decoder is configured to check for a match between a memory tag comprised by the AFT-ECC and the pointer tag.

15. The machine memory system of claim 13, wherein the encoder embeds the pointer tag as the memory tag in the AFT-ECC.

16. The machine memory system of claim 8, wherein the encoder and the decoder are disposed on an atomic data path to the processor.

17. A device comprising:
a memory channel configured to move a data value between machine memory levels;
an encoder disposed along the memory channel configured to generate a codeword for the data value, the codeword comprising an error-correcting code (ECC) comprising a memory tag; and
a decoder disposed along the memory channel configured to utilize logic that implements a tag matrix of all-even-weight columns and a parity-check matrix of all-odd-weight columns to identify (a) inconsistencies between the memory tag and a pointer tag associated with a memory pointer, and (b) integrity errors in the data value.

18. The device of claim 17, wherein the columns of the parity-check matrix comprise Hsiao codes.

19. The device of claim 17, wherein the tag matrix comprises all weight-2 columns.

20. The device of claim 17, wherein a number of 1s is minimized in the tag matrix.

21. The device of claim 17, wherein a maximum number of 1s per row is minimized in the tag matrix.

22. The device of claim 17, wherein the columns of the tag matrix are configured into a sorted order.

23. The device of claim 17, further comprising:
logic to configure a tag size by configuring an operative sub-set of one or both of the columns and rows of the tag matrix.

* * * * *